US012587775B2

(12) United States Patent
Wang et al.

(10) Patent No.: US 12,587,775 B2
(45) Date of Patent: Mar. 24, 2026

(54) EARPHONE

(71) Applicant: SHENZHEN SHOKZ CO., LTD., Shenzhen (CN)

(72) Inventors: Yonggen Wang, Shenzhen (CN); Xin Qi, Shenzhen (CN); Ao Ji, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 305 days.

(21) Appl. No.: 18/307,776

(22) Filed: Apr. 26, 2023

(65) Prior Publication Data

US 2023/0370763 A1 Nov. 16, 2023

Related U.S. Application Data

(63) Continuation of application No. PCT/CN2022/089837, filed on Apr. 28, 2022.

(30) Foreign Application Priority Data

Apr. 28, 2021 (CN) ......................... 202120905254.3
Apr. 28, 2021 (CN) ......................... 202120906926.2
Apr. 28, 2021 (CN) ......................... 202120907335.7
Apr. 28, 2021 (CN) ......................... 202120908450.6
Apr. 28, 2021 (CN) ......................... 202120908662.4

(51) Int. Cl.
*H04R 1/10* (2006.01)

(52) U.S. Cl.
CPC ........... *H04R 1/105* (2013.01); *H04R 1/1066* (2013.01)

(58) Field of Classification Search
CPC .. H04R 1/105; H04R 1/1066; H04R 2201/10; H04R 1/1008; H04R 2460/13;
(Continued)

(56) References Cited

U.S. PATENT DOCUMENTS

2009/0185699 A1 7/2009 Kim
2013/0272560 A1 10/2013 Dougherty et al.
(Continued)

FOREIGN PATENT DOCUMENTS

CN 1980487 A 6/2007
CN 201491224 U * 5/2010 ............... H04R 1/10
(Continued)

OTHER PUBLICATIONS

Notice of Reasons for Rejection in Japanese Application No. 2023539026 mailed on Jan. 7, 2025, 14 pages.
(Continued)

*Primary Examiner* — Angelica M McKinney
(74) *Attorney, Agent, or Firm* — METIS IP LLC

(57) ABSTRACT

One or more embodiments of the present disclosure relate to an earphone, the earphone comprises: a speaker assembly configured to contact with a human head and transmit sound; a function assembly electrically connected to the speaker assembly and configured to control the speaker assembly; and an ear hook connected between the speaker assembly and the function assembly, wherein an attitude or position of the speaker assembly or the function assembly is adjustable with respect to the ear hook.

19 Claims, 15 Drawing Sheets

(58) Field of Classification Search
CPC ...... H04R 5/0335; H04R 1/46; H04R 25/606; H04R 1/1083; H04R 5/02; H04R 1/10
See application file for complete search history.

(56) References Cited

U.S. PATENT DOCUMENTS

| | | | | |
|---|---|---|---|---|
| 2014/0233765 | A1* | 8/2014 | Andersson | H04R 25/606 381/151 |
| 2017/0127167 | A1 | 5/2017 | Zheng et al. | |
| 2019/0282197 | A1* | 9/2019 | Matsumoto | H04R 1/46 |
| 2020/0228904 | A1 | 7/2020 | Liao et al. | |
| 2021/0014595 | A1 | 1/2021 | Li et al. | |
| 2021/0067862 | A1 | 3/2021 | Li et al. | |
| 2021/0160633 | A1 | 5/2021 | Liao et al. | |
| 2021/0160635 | A1 | 5/2021 | Liao et al. | |

FOREIGN PATENT DOCUMENTS

| | | | | | |
|---|---|---|---|---|---|
| CN | 105007551 | A1 | | 10/2015 | |
| CN | 107484054 | A | * | 12/2017 | H04R 1/1083 |
| CN | 208143454 | U | | 11/2018 | |
| CN | 209299454 | U | | 8/2019 | |
| CN | 209419803 | U | | 9/2019 | |
| CN | 210075525 | U | | 2/2020 | |
| CN | 210225689 | U | | 3/2020 | |
| CN | 111200768 | A | | 5/2020 | |
| CN | 111654771 | A | | 9/2020 | |
| CN | 211982102 | U | | 11/2020 | |
| CN | 112261538 | A | | 1/2021 | |
| CN | 212344027 | U | | 1/2021 | |
| CN | 212344032 | U | | 1/2021 | |
| CN | 212519361 | U | | 2/2021 | |
| CN | 212544028 | U | | 2/2021 | |
| CN | 112533101 | A | | 3/2021 | |
| CN | 214707996 | U | | 11/2021 | |
| CN | 216146431 | U | | 3/2022 | |
| CN | 216146432 | U | | 3/2022 | |
| JP | H10243492 | A | | 9/1998 | |
| JP | H11275674 | A | | 10/1999 | |
| JP | 2010192975 | A | | 9/2010 | |
| JP | 2012015690 | A | | 1/2012 | |
| KR | 100755239 | B1 | | 9/2007 | |
| WO | WO-2015037317 | A1 | * | 3/2015 | H04R 5/02 |

OTHER PUBLICATIONS

The Extended European Search Report in European Application No. 22794977.3 mailed on Jul. 15, 2024, 9 pages.
Notice of Reasons for Rejection in Japanese Application No. 2023539026 mailed on Sep. 9, 2024, 8 pages.
Zhong, Jiade, Listening to music with bones,Have you tried it?After Shokz Bluez 2 Bone Conduction Headphones Experience Review, CNKI, 2014, 4 pages.
Anonymous, China Special! After Shokz Bone Transfer Headphones Red Edition Limited Edition, CNKI, 2015, 2 pages.
Zhang, Yue, Audible After Shokz Bluez 2, CNKI, 2015, 3 pages.
Yang, Guoping, In the Name of Health, Free Both ears After Shokz Bluez 2 Bone Conduction Headphones, Wanfang Data, 2014, 2 pages.
Notarization-1895, 2023, 68 pages.
Notarization-1896, 2023, 27 pages.
Notarization-1897, 2023, 13 pages.
Notarization-1898, 2023, 34 pages.
Notarization-2505, 2023, 25 pages.
Test Report of National Institute of Metrology, China, Bone Guide Earphone (Headband force), National Institute of Metrology,China, 2023, 9 pages.
Notarization-14883, 2023, 114 pages.
Notice of Preliminary Rejection in Korean Application No. 1020237020198 mailed on May 31, 2024, 10 pages.
Kun, Lun, Safety Entertainment Both-terShokz AS500 Bone Conduction Headphones Review, Jiguo, 2015, 30 pages.
Chaser, Built for Sport—AfterShokz AS500 Bone Conduction Headphones Review, Jiguo, 2015, 31 pages.
Zalanud Weinman, AfterShokz Shaun As500 Bluez 2 Bone Conduction Bluetooth Headset Use 2 Months Review, What's Worth Buying, 2014, 21 pages.
Kitty Black CK, Your Bones Sing—AfterShokz As500 Bone Conduction Headphones, Jiguo, 2015, 20 pages.
Shepherd's Field, Surgical Cycling Essentials—AfterShokz As500 Bone Conduction Headphones Trial Experience, Jiguo, 2015, 25 pages.
First Office Action in Chinese Application No. 202280007021.9 mailed on Jan. 30, 2026, 13 pages.

* cited by examiner

EARPHONE

CROSS-REFERENCE TO RELATED APPLICATIONS

This application is a Continuation of International application No. PCT/CN2022/089837, filed on Apr. 28, 2022, which claims priority to Chinese Patent Application No. 202120907335.7 filed on Apr. 28, 2021, priority to Chinese Patent Application No. 202120905254.3 filed on Apr. 28, 2021, priority to Chinese Patent Application No. 202120908662.4 filed on Apr. 28, 2021, priority to Chinese Patent Application No. 202120908450.6 filed on Apr. 28, 2021, and priority to Chinese Patent Application No. 202120906926.2, filed on Apr. 28, 2021, the contents of which are hereby incorporated by reference to its entirety.

TECHNICAL FIELD

The present disclosure relates to the field of acoustics, and more particularly, relates to an earphone.

BACKGROUND

Earphones have been widely used in people's daily life, which can be used with cell phones, computers and other electronic devices in order to provide users with an auditory feast. According to the working principle of earphones, the earphones can be generally divided into air conduction earphones and bone conduction earphones. According to the way users wear earphones, the earphones can generally be divided into headsets, supra-aural earphones and in-ear earphones. According to the interaction between earphones and electronic devices, the earphones can also be generally divided into wired earphones and wireless earphones. At present, the headsets or supra-aural earphones usually use the fixed structure (e.g., an ear hook, or a rear hook) so that the earphones can be fixed on the circumference of the users' ear. The comfort and stability of the earphones will greatly affect the users' choice and experience.

Therefore, it is desirable to provide an earphone to improve the comfort of the users and the stability of the earphone in terms of wearing.

SUMMARY

According to some embodiments of the present disclosure, an earphone is provided. The earphone may include a speaker assembly configured to contact with a human head and transmit sound; a function assembly electrically connected to the speaker assembly and configured to control the speaker assembly; and an ear hook connected between the speaker assembly and the function assembly. An attitude or position of the speaker assembly or the function assembly may be adjustable with respect to the ear hook.

In some embodiments, the ear hook may be rigidly connected between the speaker assembly and the function assembly, so that a preset angle may be formed between a first surface of the speaker assembly toward the human head and a second surface of the function assembly toward the human head, and a force generated by a contact between the first surface and the human head may be greater than or equal to 0.1 N and less than or equal to 4.5 N.

In some embodiments, the preset angle may be in a range of 5 degrees to 10 degrees.

In some embodiments, the first surface may include a curved surface that is outwardly convex.

In some embodiments, the function assembly may be provided with a chamfered corner adjacent to a back side of a human ear.

In some embodiments, the function assembly may be telescopically connected to the ear hook.

In some embodiments, the ear hook may include a first tube body and a second tube body. One end of the first tube body may be rigidly connected to the speaker assembly, the other end of the first tube body may be telescopically connected to one end of the second tube body, and the other end of the second tube body may be rigidly connected to the function assembly.

In some embodiments, the function assembly may be flexibly connected to the ear hook, and the function assembly may follow a deflection when the function assembly is touched by an external force.

In some embodiments, the function assembly may be provided with a turning hole, and one end of the ear hook may be rotatably connected to the turning hole.

In some embodiments, the function assembly may further include a function housing and a flexible connection member. The function housing may be configured to hold a circuit board and/or a battery, and the ear hook may be connected to the function housing by the flexible connection member.

In some embodiments, the flexible connection member may include a torsion spring.

In some embodiments, the flexible connection member may include a damped swivel.

In some embodiments, in a state where the function assembly is not in contact with the human head and a human ear, a surface of the function assembly toward the human head may be in a first position; in a state where the function assembly is worn, a surface of the function assembly toward the human head may be in a second position. A deflection angle between the surfaces of the function assembly at the first position and the second position toward the human head may be within a range of 0 degrees to a preset threshold angle.

In some embodiments, a value of the preset threshold angle may be in a range of 10 degrees to 20 degrees.

In some embodiments, the function assembly may be deflected toward a side close to the human head and/or deflected toward a side away from the human head.

In some embodiments, the function assembly may be provided with a chamfered corner adjacent to a back of an external ear.

In some embodiments, the ear hook may include an elastic ear hook, and the ear hook may be fixedly connected to a front side or a bottom side of the speaker assembly.

In some embodiments, the speaker assembly may be adjustable in attitude with respect to the ear hook.

In some embodiments, a side of the speaker assembly away from the human head may be flexibly connected to one end of the ear hook.

In some embodiments, the speaker assembly may be connected to the ear hook by a universal joint.

In some embodiments, the ear hook may include an elastic ear hook and the ear hook may be fixedly connected to a front side of the speaker assembly.

In some embodiments, the ear hook may include an elastic ear hook and the ear hook may be fixedly connected to a bottom side of the speaker assembly.

In some embodiments, a side of the speaker assembly toward the human head may include a curved surface that is outwardly convex. The curved surface may be configured to fit to the human head.

In some embodiments, a side edge of the speaker assembly toward the human head may be provided with an adhesive layer. The adhesive layer may be configured to affix to the human head.

In some embodiments, a side edge of the speaker assembly toward the human head may be provided with an anti-slip member.

In some embodiments, a side of the anti-slip member away from the speaker assembly may be provided with a plurality of convex particles.

In some embodiments, a side of the speaker assembly toward the human head may further be provided with a water-absorbent polymer layer.

In some embodiments, the speaker assembly, the function assembly, and the ear hook may be provided in two groups correspondingly located on left and right sides of the human head, and the earphone may further includes a rear hook connected between two groups of the function assemblies or two groups of the ear hooks. A position of the rear hook may be adjustable with respect to the function assemblies.

In some embodiments, the rear hook may be rotatably connected to the function assembly or the ear hook.

In some embodiments, the rear hook may be telescopically connected to the function assembly.

In some embodiments, the function assembly may be in a form of a block, one end of the ear hook may be connected to a width side edge of the function assembly, and the rear hook may be flexibly connected between two groups of the ear hooks. A total mass of the speaker assembly may be greater than a total mass of the function assembly and the rear hook.

In some embodiments, in a worn state, the ear hook may be supported on a human ear and a torque generated by the two groups of the speaker assemblies may be balanced with a torque generated by the two groups of the functional assemblies and the rear hooks.

In some embodiments, a torque generated from the two groups of the speaker assembly to support points of the ear hooks on the human ear may be balanced with a torque generated from the two groups of the function assemblies and the rear hooks to support points of the ear hooks on the human ear.

In some embodiments, the function assembly may be in a form of a block and may be set vertically, the rear hook may be connected between two long side edges of the function assembly, and the rear hook may be slidingly connected to the function assembly.

In some embodiments, the rear hook may include a first sliding portion and two second sliding portions. Two ends of the first sliding portion may be slidingly connected to the two second sliding portions respectively, and the second sliding portions may be connected to the corresponding function assembly; or each end of two ends of the rear hook may be slidingly connected to the corresponding function assembly and be capable of being slidingly adjusted along a width side edge of the corresponding function assembly.

In some embodiments, two groups of the function assemblies may be configured to clamp on two sides of the human head, and in a worn state, a torque from the two groups of the speaker assemblies to the corresponding function assemblies may be balanced with a torque from the rear hook to the function assemblies.

In some embodiments, the rear hook may be connected between two groups of the ear hooks, and in the worn state, the rear hook may be supported on a top of the human head. The rear hook may include a first headwear portion and two second headwear portions. One end of each of the two second headwear portions may be rotatably connected to one end of the first headwear portion, and the second headwear portions may further be connected to the ear hooks. In the worn state, the second headwear portions may be rotatable in a vertical direction with respect to the first headwear portion.

In some embodiments, a torque generated by the speaker assembly may be balanced with a torque generated by the function assembly.

In some embodiments, the function assembly may be connected to one end of the ear hook and be provided in a streamlined shape with the ear hook. Each of two ends of the rear hook may be connected to an end of the corresponding function assembly away from the ear hook and the ear hook may be provided in a streamlined shape with the function assembly.

In some embodiments, a slope of the function assembly with respect to the ear hook may be in a range of 0 degrees to 15 degrees.

In some embodiments, a length size of the function assembly along an extension direction of the ear hook may be greater than a body size of the function assembly along a direction perpendicular to the extension direction.

In some embodiments, a ratio of the length size of the function assembly along the extension direction of the ear hook to the body size of the function assembly along the direction perpendicular to the extension direction may be less than 10.

In some embodiments, the body size may be less than or equal to 10 mm.

In some embodiments, the body size may be 8 mm and the length size may be 40 mm.

In some embodiments, the rear hook may include a metal body. The metal body may be electrically connected to the function assembly to act as an antenna for the earphone.

In some embodiments, two ends of the metal body may be electrically connected to the two groups of the function assemblies respectively.

In some embodiments, the metal body may include a first sub-antenna and a second sub-antenna. The first sub-antenna and the second sub-antenna may be electrically connected to the corresponding function assemblies respectively, and the first sub-antenna and the second sub-antenna may be disposed at intervals.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

Figure 1:
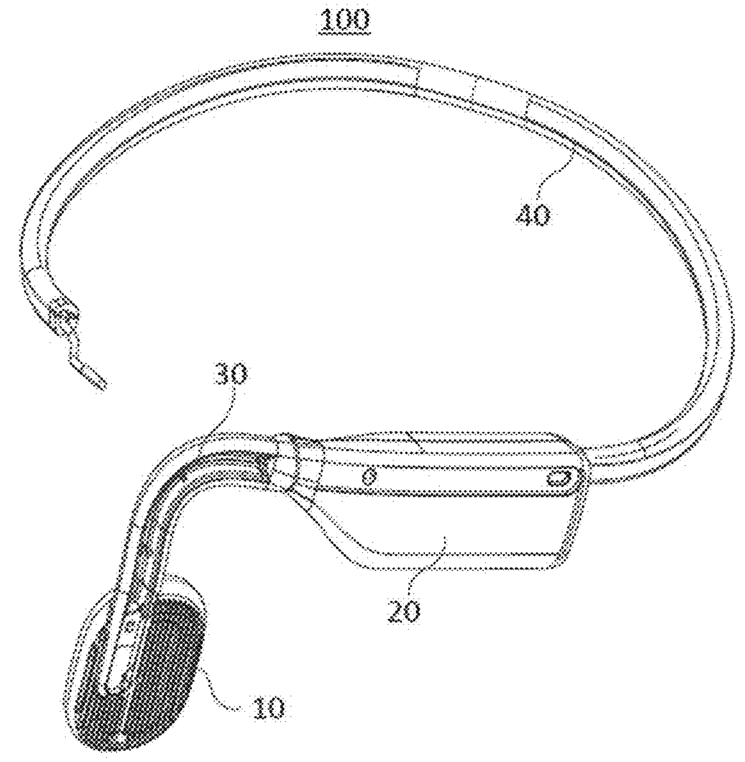
FIG. 1 is a structural diagram illustrating an exemplary earphone according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a,", "one," and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the preceding or following operations are not necessarily performed in order to accurately. Instead, the operations may be processed in reverse order or simultaneously. Moreover, one or more other operations may be added to the flowcharts. One or more operations may be removed from the flowcharts.

The embodiments of the present disclosure provide an earphone. In some embodiments, the earphone in the embodiments of the present disclosure may include a headset or a supra-aural earphone, according to the manner in which the earphone is worn. When a user wears the earphone, the weight of the earphone may be supported primarily by the user's head, for example, the weight of the earphone is supported by a human ear, or the weight of the earphone is supported by a human head. In some embodiments, the earphone in the embodiments of the present disclosure may include an air conduction earphone, a bone conduction earphone, or a combined bone and air conduction earphone, according to the working principle of the earphone. The combined bone and air conduction earphone may be an earphone capable of producing both air conduction sound and bone conduction sound.

The bone conduction earphone makes contact with human skin and transmits sound through bones of a human body to a human auditory system, thereby allowing the user to hear sound. In some embodiments, the bone conduction earphone may obtain a sound signal containing audio information and generate a vibration based on the sound signal, which may be transmitted to the user's bones via a transmission component (e.g., a vibration panel), and the user's auditory system may receive the vibration through the bones to further perceive the audio information. In some embodiments, the bone conduction earphone may receive a signal containing audio information and convert the audio information into a sound vibration via a transducer, and the sound may then be transmitted to a sensory organ of the user so that the sound can be heard.

In some embodiments, the earphone may include a speaker assembly, a function assembly, and an ear hook. The speaker assembly may contact with a human head and transmit sound. The function assembly may be electrically connected to the speaker assembly, and the function assembly may control the sound transmission of the speaker assembly. The ear hook may be connected between the speaker assembly and the function assembly, and the ear hook may be configured to fix the speaker assembly to the user's head or an ear of the user. In some embodiments, the earphone may also include a rear hook, which is connected between two groups of function assemblies or two groups of ear hooks. In some embodiments, the earphone may include two groups of speaker assemblies, two groups of function assemblies and two groups of ear hooks. Two groups of devices may be located near the left and right ears of the human body, respectively. The rear hook may be connected between the two groups of function assemblies or the two groups of ear hooks, and the rear hook may cooperate with the ear hooks to make the earphone better fixed on the user's head or the ear of the user. In some embodiments, the earphone may not include a rear hook, and the earphone may be worn on the human ear by the ear hook alone. For example, the ear hook may be provided with a shape structure (e.g., a hook structure, a C-shaped structure, etc.) that is adapted to the human ear, and the ear hook may be capable of being hooked to the human ear.

In some embodiments, by adjusting the structure of the various components of the earphone and the connection relationship (e.g., a connection manner) and relative position between the various components, it is possible to make the earphone to fit close to the user's head without causing a relative greater sense of pressure to the user when the user wears the earphone, so as to improve the user's wearing comfort; at the same time, it is also possible to make the earphone achieve a torque balance about a support position to facilitate balance adjustment of the earphone, so as to improve the stability of the user's wearing.

FIG. 1 is a structural diagram illustrating an exemplary earphone according to some embodiments of the present disclosure.

As shown in FIG. 1, the earphone 100 may include a speaker assembly 10, a function assembly 20, an ear hook 30, and a rear hook 40. The speaker assembly 10 may be in contact with a human head and transmit sound. The function assembly 20 may be electrically connected to the speaker assembly 10, and the function assembly 20 may control a sound transmission of the speaker assembly 10. The ear hook 30 may be connected between the speaker assembly 10 and the function assembly 20, and the ear hook 30 may be configured to fix the speaker assembly 10 near an ear of the user. In some embodiments, there may be two speaker assemblies 10, two function assemblies 20 and two ear hooks 30 corresponding to left and right sides of the human head, respectively. The rear hook 40 may be connected between the two function assemblies 20 or the two ear hooks 30.

The speaker assembly 10 may include a core housing and an earphone core. The core housing may be connected to one end of the ear hook 30 and be configured to accommodate the earphone core. In some embodiments, the core housing may include two housing sections, e.g., a first core housing section and a second core housing section. The first core housing section and the second core housing section may be connected by a snap-fit connection (or fastener, adhesive, etc.) and form a space for accommodating the earphone core. The earphone core may be located in an internal space formed by the core housing. The earphone core may be configured to convert an electrical signal into a corresponding mechanical vibration (i.e., "sound"). The earphone core may be electrically connected to the function assembly 20. In some embodiments, the speaker assembly 10 may include bone conduction sound transmission or air conduction sound transmission. In a bone conduction manner, vibrations generated by the earphone core may be transmitted to the user's face through the core housing. In an air conduction manner, the vibrations generated by the earphone core may push air vibrations to produce sound. The sound may be transmitted through one or more sound guiding holes in the core housing to the outside of the core housing and further to the user's ear.

The function assembly 20 may include a function housing, a circuit board, and/or a battery. In some embodiments, the function housing may be connected to the other end of the ear hook 30 (an end of the ear hook 30 away from the speaker assembly 10), and the function housing of the function assembly 20 may be physically connected to the core housing of the speaker assembly 10 via the ear hook 30. An interior of the function housing may form an accommodation space for accommodating the circuit board and/or battery. In some embodiments, the function assembly 20 may be electrically connected to the speaker assembly 10, allowing the function assembly 20 to perform acoustic control of the speaker assembly 10. For example, the circuit board in the function assembly 20 may be electrically connected to the earphone core of the speaker assembly 10 (e.g., electrically connected via a wire or flexible circuit board) to enable the circuit board to control the sounding of the earphone core. The circuit board may control the earphone core to convert an electrical signal into a mechanical vibration and further transmit sound to the user by bone conduction or air conduction. In some embodiments, the function assembly 20 may provide electrical power to the earphone 100. For example, the battery in the function assembly 20 may be electrically connected to the earphone core of the speaker assembly 10 to enable the battery to provide electrical power for the sound generation of the earphone core. In some embodiments, the circuit board and the battery may be provided within the same function housing. In some embodiments, the circuit board and the battery may also be provided in two separate function housings. The circuit board and the battery may be electrically connected to each other via corresponding conductors, and further electrically connected to the earphone core in the speaker assembly 10 via the conductors.

The ear hook 30 may be connected between the speaker assembly 10 and the function assembly 20. In some embodiments, the ear hook 30 may include a first ear hook section and a second ear hook section. The first ear hook section and the second ear hook section may be connected by a snap-fit connection, adhesive, etc. The first ear hook section may be provided a cable trunking to accommodate the wire or flexible circuit board that is from the function assembly 20 to the speaker assembly 10, and the first ear hook section and the second ear hook section may be snapped together to prevent the wire or flexible circuit board from being exposed.

The rear hook 40 may be connected between the two groups of function assemblies 20 or the two ear hooks 30. In some embodiments, when the user wears the earphone 100, the two groups of speaker assemblies 10 may be located on the left and right sides of the human head, and the two ear hooks 30 and the rear hook 40 work together to enable the two groups of speaker assemblies 10 to clamp the human head and contact the user's skin, thus enable the transmission of sound based on, for example, bone conduction technology. In some embodiments, the earphone 100 may not include the rear hook 40, and the earphone 100 may be worn on the human ear by the ear hook 30 alone. For example, the ear hook 30 may be provided with a shape structure (e.g., a hook structure, a C-shaped structure, etc.) that is adapted to the human ear, and the ear hook 30 may be capable of being hooked to the human ear.

It should be noted that the earphone 100 provided in the embodiments of the present disclosure may also include a microphone, a sound pickup, and other microphones. The earphone 100 may be capable of capturing sound signals external to the earphone 100 using the microphone. The earphone 100 may further include a communication device such as a Bluetooth or a near field communication (NFC), and the communication device may be electrically connected to the circuit board and the battery through corresponding conductors to achieve the corresponding function.

It can be understood that there may be two speaker assemblies 10 in the embodiments of the present disclosure. Both speaker assemblies 10 may generate sound, so that a stereo sound effect of the earphone 100 can be achieved, thus improving the acoustic performance of the earphone 100. In other embodiments, when the earphone 100 is used in other applications where the stereo sound needs are not particularly high, for example, a hearing patient hearing aid, a (host) live teleprompter, etc., the earphone 100 may also be configured with only one speaker assembly 10. In addition, the orientation used in the description of the embodiments of the present disclosure is mostly described with reference to a scene that the earphone 100 is worn on the human head, to facilitate a more concise and clear representation of the features of the earphone 100, and the human head and other biological features should not be regarded as the features on the earphone 100 protected by the present disclosure.

In some embodiments, by adjusting the structure of each component of the earphone 100 and the connection relationship (e.g., the connection manner) and relative position between each component, it is possible to make the earphone stable and fixed on the user's head without causing a large pressure on the user's head when the user wears the earphone, improving the stability and comfort of the user wearing the earphone. For example, by setting the connection between the speaker assembly 10 and the ear hook 30, the connection between the ear hook 30 and the function assembly 20, the connection between the rear hook 40 and the function assembly 20 or the ear hook 30, the structure of the function assembly 20, the structure of the ear hook 30 and the structure of the rear hook 40, etc., the earphone can have better stability and comfort during the wearing process. The following is a detailed description of the structures, the connection manners, and the position relationships of each component of the earphone.

In some embodiments, the speaker assembly 10 may be fixedly connected to the ear hook 30. For example, the ear hook 30 and the speaker assembly 10 may be fixedly connected by gluing, clamping, riveting, one-piece injection molding, etc. In some embodiments, the speaker assembly 10 may also be flexibly connected to the ear hook 30. For example, the ear hook 30 may be flexibly connected to the speaker assembly 10 by a hinge, a universal joint, etc. In some embodiments, the first ear hook section of the ear hook 30 and the first core housing section of the speaker assembly 10 may be fixedly connected or flexibly connected.

Figure 2:
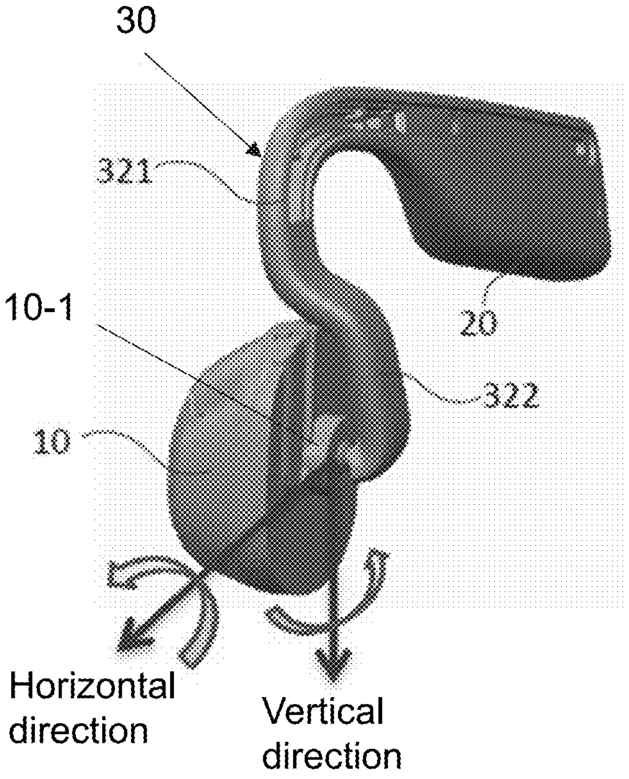
FIG. 2 is a structural schematic diagram illustrating a form of connection between a speaker assembly and an ear hook in FIG. 1 according to some embodiments of the present disclosure.

FIG. 2 is a structural schematic diagram illustrating a form of connection between a speaker assembly and an ear hook in FIG. 1 according to some embodiments of the present disclosure. Referring to FIG. 2, the speaker assembly 10 may be adjusted in attitude with respect to the ear hook 30 so that the speaker assembly 10 fits better on the human head when the earphone 100 is worn, avoiding the poor sound transmission caused by the speaker assembly 10 being skewed with respect to the human head. In some embodiments, the speaker assembly 10 may be skewed with respect to the human head, resulting in the speaker assembly 10 not fitting on the human head. In such cases, the speaker assembly attitude adjustment may allow a surface of the speaker assembly 10 toward a side of the body's head to better fit the body's head. In some embodiments, the skewing of the speaker assembly 10 with respect to the human head may result in that a position of a sound guiding hole in the speaker assembly 10 is out of the direction of the user's ear canal. In this case, the speaker assembly attitude adjustment can make that the sound guiding hole on the speaker assembly 10 (in the case of air conduction) is oriented toward the user's ear canal.

In some embodiments, the ear hook 30 may include a rigid ear hook. The ear hook 30 may be made of rigid plastic or rubber, or metal parts such as steel bars may be embedded inside the ear hook 30, such that the ear hook 30 may be made rigid and non-deformable as a whole. As shown in FIG. 2, a side of the speaker assembly 10 away from the human head may be connected to one end of the ear hook 30 so that the speaker assembly 10 can be adjusted relative to the ear hook 30 for ensuring that when the user wears the earphone 100, the earphone 100 can fit as closely as possible to the human head.

In some embodiments, the speaker assembly 10 may be flexibly connected to the ear hook 30 by a universal joint. The ear hook 30 may be provided with a smoother sphere at one end of the ear hook 30 that is connected with the speaker assembly 10, and the speaker assembly 10 may be provided with a convex table 10-1 on a side of the speaker assembly 10 away from the human head. The convex table 10-1 may be provided with a concave groove, in which the sphere is stuck, and the sphere may be rotated in the concave groove to form a universal joint structure. The sphere and the convex table 10-1 may be rotated relative to each other so as to achieve attitude adjustment of the speaker assembly 10 with respect to the ear hook 30. In some embodiments, by setting a size of the concave groove on the convex table 10-1 and a size of the sphere in the ear hook 30, it is possible to adjust the attitude adjustment range of the speaker assembly 10 with respect to the ear hook 30. In some embodiments, in order to fit a side surface of the speaker assembly 10 toward the human head as much or as much as possible, a rotation angle of the speaker assembly 10 relative to the ear hook 30 in a vertical direction (as shown in FIG. 2) may be set within a range of plus or minus 5 degrees, and a rotation angle of the speaker assembly 10 relative to the ear hook 30 in a horizontal direction (as shown in FIG. 2) may be set within a range of plus or minus 10 degrees. In some embodiments, in order to make the side surface of the speaker assembly 10 toward the human head to fit as much or all of the different human heads as possible on more occasions, the speaker assembly 10 may be set to rotate within a range of plus or minus 10 degrees relative to the ear hook 30 in the vertical direction, and the speaker assembly 10 may rotate within a range of plus or minus 15 degrees relative to the ear hook 30 in the horizontal direction. The positivity and negativity of the rotation angle refers to that the speaker assembly 10 rotates in a different direction relative to the ear hook 30 around a certain direction. For example, the rotation angle may be positive when the speaker 10 rotates relative to the ear hook 30 around the vertical direction along a clockwise rotation direction; the rotation angle may be negative when the speaker 10 rotates relative to the ear hook 30 around the vertical direction along a counterclockwise rotation direction.

In some embodiments, referring to FIG. 2, the ear hook 30 may include an extension section 321 and an offset section 322 that are connected. The ear hook 30 may be connected to the function assembly 20 via the extension section 321. The ear hook 30 may be connected to the speaker assembly 10 through the offset section 322. In some embodiments, a side of the extension section 321 that is away from the human head and a side of the function assembly 20 that is away from the human head may be provided co-planar. The offset section 322 may be offset relative to the extension section 321 in a direction away from the human head, and one end of the offset section 322 may be flexibly connected to the speaker assembly 10. In some embodiments, the thickness of the speaker assembly 10 may be thicker and the extension section 321 may be offset relative to the offset section 322 in a direction closer to the human head, so that the function assembly 20 connected to the extension section 321 can also be closer to the human head, avoiding the discomfort of the function assembly 20 against a back of an external ear. The thickness of the speaker assembly 10 may refer to a distance between a side of the speaker assembly 10 that fits against the human skin and a side that is away from the human skin.

In some embodiments, the speaker assembly 10 may also be hinged to the ear hook 30, and the speaker assembly 10 may be attitude adjustable relative to the ear hook 30 around a hinged orientation. In some embodiments, the hinged direction of the speaker assembly 10 and the ear hook 30 may be in a vertical or horizontal direction, such that the speaker assembly 10 may be attitude adjustable relative to the ear hook 30 around the vertical or horizontal direction.

In some embodiments, the speaker assembly 10 may also be rotatably connected to the ear hook 30. The speaker assembly 10 and the ear hook 30 may be rotatably connected to each other by an axis-hole fit. For example, the speaker assembly 10 may be provided with the convex table 10-1 on a side of the speaker assembly 10 away from the human head, and the convex table 10-1 may be provided with a hole concave to its interior. One end of the ear hook 30 connected to the speaker assembly 10 may extend into the hole and be rotatable inside the hole. With this setup, the speaker assembly 10 may be rotated around an axis of the ear hook 30 for attitude adjustment to improve the fit of the earphone 100 in a worn state, thereby improving the fit of the speaker assembly 10 to the human head.

Figure 3:
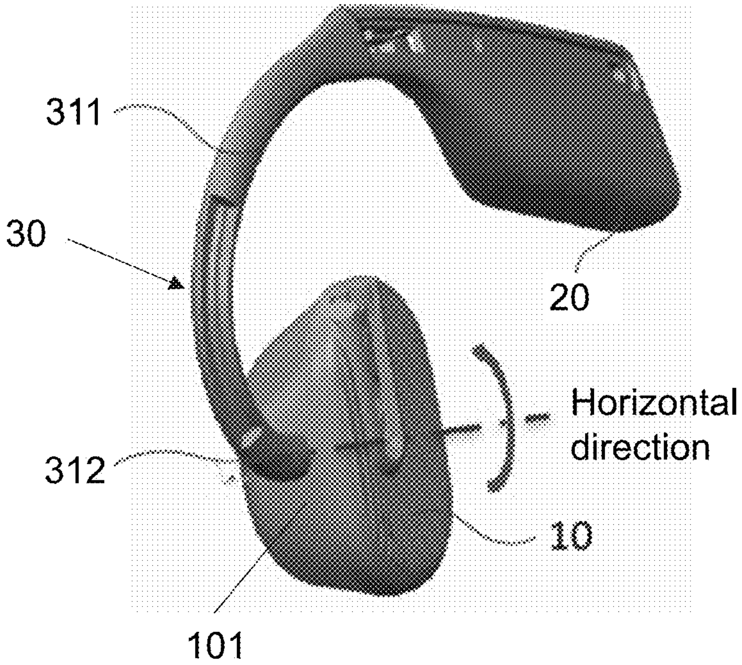
FIG. 3 is another structural schematic diagram illustrating the form of connection between the speaker assembly and the ear hook in FIG. 1 according to some embodiments of the present disclosure.

FIG. 3 is another structural schematic diagram illustrating the form of connection between the speaker assembly and the ear hook in FIG. 1 according to some embodiments of the present disclosure. Referring to FIG. 3, in some embodiments, the ear hook 30 may include an elastic ear hook. The ear hook 30 may be made of silicone, plastic, rubber and other materials with good elasticity. The ear hook 30 may be fixedly connected to the speaker assembly 10, and using the ear hook 30's own elasticity, the attitude adjustment of the speaker assembly 10 relative to the ear hook 30 may be realized.

As shown in FIG. 3, the ear hook 30 may be curve shaped. The ear hook 30 may extend in an arc from a position where the ear hook is connected to the speaker assembly 10. In some embodiments, the ear hook 30 may include a curved segment 311 and a horizontal segment 312 that are connected. The curved segment 311 may be curve shaped and connected to the function assembly 20, and the horizontal segment 312 may be straight shaped and set horizontal or substantially horizontal when the earphone 100 is worn on the human head. One end of the horizontal segment 312 may be connected to the speaker assembly 10 away from the curved segment 311 so that the elasticity of the ear hook 30 can be used to allow the speaker assembly 10 to adjust its attitude around the horizontal direction (as shown in FIG. 3) in the worn state. In some embodiments, in order to allow a side surface of the speaker assembly 10 toward the human head to fit as closely or as fully as possible to the human head, the speaker assembly 10 may be rotated within a range of plus or minus 15 or plus or minus 10 degrees relative to the ear hook 30 for attitude adjustment.

In some embodiments, when a surface of the speaker assembly 10 toward the human head is skewed relative to the human head, the human head may be in contact with the surface of the speaker assembly 10 toward the human head, which allows the speaker assembly 10 to be deflected by force, thereby enabling attitude adjustment and allowing the surface of the speaker assembly 10 toward the human head to fit completely on the human head. In some embodiments, the ear hook 30 may be gradually tilted toward the human head from the end of the ear hook 30 that is connected to the function assembly 20 to the end of the ear hook 30 that is connected to the speaker assembly 10, so that a distance between the two groups of speaker assemblies 10 may be less than a width of the human head (the width of the human head may be approximately equal to a distance between the left and right ears of the human body). When the earphone 100 is worn on the human head, the human head may adaptively exert a pretension stress on the speaker assembly 10, thus ensuring that the speaker assembly 10 adaptively adjusts its attitude with respect to the ear hook 30. The pretension stress may refer to a force exerted by the human head on the speaker assembly 10 that causes the speaker assembly 10 to deflect.

Figure 4:
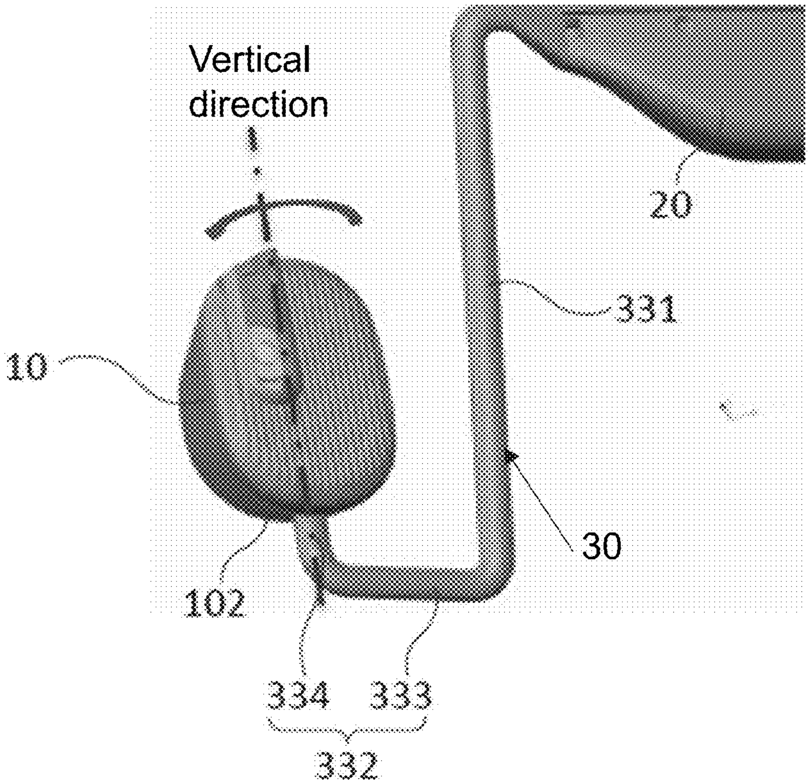
FIG. 4 is another structural schematic diagram illustrating the form of connection between the speaker assembly and the ear hook in FIG. 1 according to some embodiments of the present disclosure.

FIG. 4 is another structural schematic diagram illustrating the form of connection between the speaker assembly and the ear hook in FIG. 1 according to some embodiments of the present disclosure. In some embodiments, referring to FIG. 4, the ear hook 30 may include an elastic ear hook that is fixedly connected to a bottom side 102 of the speaker assembly 10 toward the chin of the human body. In some embodiments, the ear hook 30 may extend in a bend from a position between the speaker assembly 10 and the human ear and be connected to the bottom side 102. In some embodiments, the ear hook 30 may also extend in a bend from a front side 101 (refer to FIG. 3) of the speaker assembly 10 away from the human ear and be connected to the bottom side 102.

As shown in FIG. 4, the ear hook 30 may include a first bend section 331 and a second bend section 332 that are connected. The first bend section 331 may be connected to the function assembly 20 and bent toward the chin of the body relative to the function assembly 20. The second bend section 332 may be bent toward the bottom side 102 of the ear hook 30 relative to the first bend section 331 and connected to the bottom side 102. In some embodiments, the second bend section 332 may include a horizontal sub-section 333 and a vertical sub-section 334 that are connected in a bend. The horizontal sub-section 333 may be connected to the first bend section 331 and bent relative to the first bend section 331 so that the second bend section 332 extends below the bottom side 102. In a worn state, the horizontal sub-section 333 may extend in a substantially horizontal direction. The vertical sub-section 334 may be bent relative to the horizontal sub-section 333 and extend substantially vertically in the worn state. One end of the vertical sub-section 334 may be connected to the speaker assembly 10 away from the horizontal sub-section 333 so that the elasticity of the ear hook 30 may be used to allow the speaker assembly 10 to be adjusted in attitude around the vertical direction in the worn state. In some embodiments, in order to fit the side surface of the speaker assembly 10 toward the human head as closely or completely as possible, the rotation range of the attitude adjustment of the speaker assembly 10 relative to the ear hook 30 may be within plus or minus 15 degrees or plus or minus 10 degrees.

In some embodiments, similar to FIG. 3, the speaker assembly 10 may be tilted toward the human head relative to the ear hook 30, i.e., the speaker assembly 10 may be tilted toward the human head from an end of the speaker assembly 10 at the connection with the ear hook 30 to an end of the speaker assembly 10 away from the connection. The human head may provide a pretension stress between the speaker assembly 10 and the human head that allows the speaker assembly 10 to make adaptive attitude adjustments relative to the ear hook 30, which in turn allows the side surface of the speaker assembly 10 toward the human head to fit completely on the human head.

In some embodiments, the side surface of the speaker assembly 10 toward the human head may include a curved surface that is outwardly convex, i.e., the side surface of the speaker assembly 10 toward the human head is at least partially outwardly convex and curved, and this setting may increase the frictional force of the speaker assembly 10 when the speaker assembly 10 is affixed to the human face, thereby improving the shock resistance of the earphone 100.

In some embodiments, a side edge of the side surface of the speaker assembly 10 toward the human head may be provided with an adhesive layer. The adhesive layer may be used to affix to the human head, i.e., when the side surface of the speaker assembly 10 toward the human head is affixed to the human face, the adhesive layer may further strengthen the affixing relationship and slow down or even eliminate the situation where the speaker assembly 10 is not affixed to the human head and slips from the human head due to other factors (e.g., a movement such as running or jumping rope). In some embodiments, the adhesive layer may include a medical glue, a hydrogel, etc. The adhesive layer may be replaced. For example, the adhesive layer may be replaced when the adhesion of the adhesive layer is weakened.

In some embodiments, the side edge of the speaker assembly 10 toward the human head may be provided with an anti-slip member. The anti-slip member may increase the friction between the side surface of the speaker assembly 10 toward the human head and the human head, slowing down or even eliminating the situation that the speaker assembly 10 is not affixed to the human head and slips off the human head due to other factors. In some embodiments, the anti-slip member may include an anti-slip sleeve that is provided on the side edge of the speaker assembly 10 toward the human head. In some embodiments, the anti-slip sleeve may include a skin-friendly material to improve the comfort of the user wearing it. In some embodiments, the anti-slip member may include an anti-slip rubber block. The anti-slip rubber block may effectively increase the friction through its rubber material, thus providing an anti-slip effect. In some embodiments, the anti-slip member may include anti-slip silicone. Using the larger friction coefficient of silicone, the friction may be increased effectively to avoid the speaker assembly 10 from being not affixed and slipping off. In some embodiments, the anti-slip member may also include other materials suitable for practical use, for example, an anti-slip hydrogel, etc.

In some embodiments, the anti-slip member may be provided with a plurality of convex particles on a side of the anti-slip member away from the speaker assembly 10, and the plurality of convex particles may increase the fit tightness with the user, thereby providing a better anti-slip effect.

In some embodiments, the side surface of the speaker assembly 10 toward the human head may also be provided with a water-absorbent gel layer. The water-absorbent gel layer may be provided at a position where the speaker assembly 10 is in contact with the human facial skin, and the water-absorbent gel layer may absorb water at the facial skin contact position to prevent the speaker assembly 10 from slipping in contact with the facial skin, thereby increasing the friction between the speaker assembly 10 and the human head.

By setting the connection manner (e.g., the rotation connection, the fixed connection) of the speaker assembly 10 and the ear hook 30 and the structure type of the ear hook 30 (e.g., the elastic ear hook, or the rigid ear hook), the attitude adjustment of the speaker assembly 10 relative to the ear hook 30 may be realized, so that the side surface of the speaker assembly 10 toward the human body can fit the human head as much as possible, and thus the wearing stability of the earphone 100 and the sound effect of the earphone 100 transmitting sound to the human body can be improved.

Figure 5:
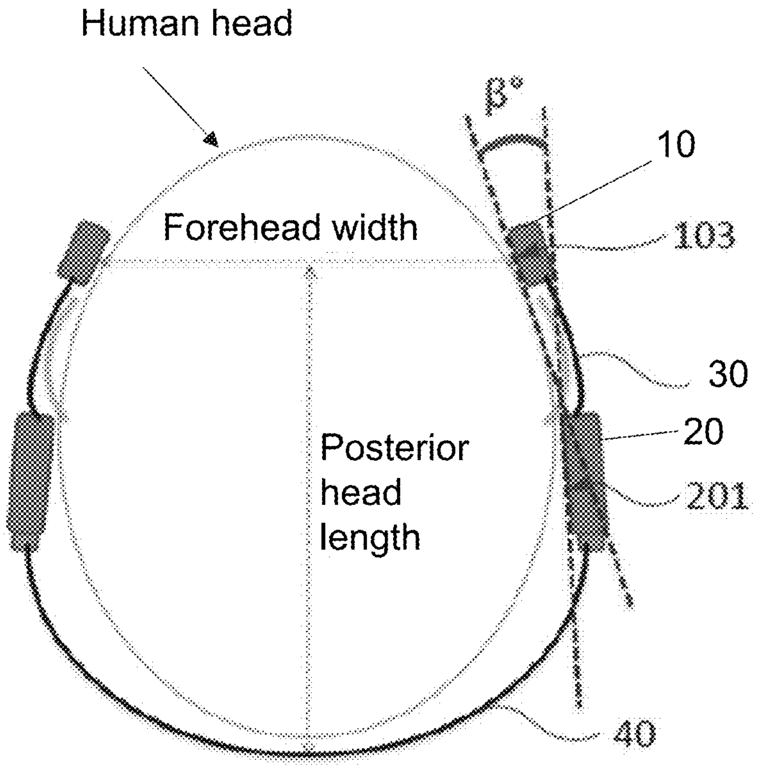
FIG. 5 is a schematic diagram illustrating a structure between the speaker assembly and a function assembly in FIG. 1 according to some embodiments of the present disclosure.

FIG. 5 is a schematic diagram illustrating a structure between the speaker assembly and the function assembly in FIG. 1 according to some embodiments of the present disclosure. Referring to FIG. 5, in some embodiments, the ear hook 30 may be rigidly connected between the speaker assembly 10 and the function assembly 20. In some embodiments, a first surface 103 of the speaker assembly 10 toward the human head and a second surface 201 of the function assembly 20 toward the human head may form fixed preset angle β, such that the function assembly 20 is not in contact with the back of the external ear when the first surface 103 is pressed against the human head and a force generated by the contact between the first surface 103 and the human head is greater than or equal to 0.1 N and less than or equal to 4.5 N. In some embodiments, the first surface 103 may be at least partially in direct or indirect contact with the human head. The force of 0.1 N may be greater than the minimum force that causes the first surface 103 of the speaker assembly 10 to be in contact with the human head, and the force of 4.5 N may be less than the minimum force that causes the human body to feel pain when the first surface 103 of the speaker assembly 10 is in contact with the human head. It can also be understood that when the force generated by the contact between the first surface 103 and the human head is greater than or equal to 0.1 N and less than or equal to 4.5 N, the first surface 103 may be made stable in contact with the human head without causing too much pressure on the head so that the human body feels pain. By setting the force generated by the contact between the first surface 103 and the human head in the range of 0.1 N to 4.5 N, the transmission efficiency and sound quality of the sound generated by the speaker assembly 10 to the human body can be improved.

In some embodiments, when the earphone 100 is a bone conduction earphone, the sound quality of the bone conduction earphone may be related to the distribution of the force on the first surface 103 of the speaker assembly 10. A frequency response curve of the speaker assembly 10 may be a superposition of frequency response curves of points on the first surface 103. In some embodiments, the force between the first surface 103 and the human head may be 0.2 N-0.8 N. In some embodiments, the force between the first surface 103 and the human head may be 0.2 N-3.6 N. In some embodiments, the force between the first surface 103 and the human head may be 0.2 N-1.5 N. In some embodiments, the force between the first surface 103 and the human head may be 0.2 N-1.5 N. In some embodiments, the force between the first surface 103 and the human head may be 0.2 N-1.5 N. In some embodiments, the force between the first surface 103 and the human head may be 0.3 N-1.8 N. For more information about the range of forces (also referred to as clamping forces) and effects of contact between the speaker assembly and the human head (e.g., the face), please refer to PCT application No. PCT/CN2015/086907, filed on Aug. 13, 2015, the relevant contents of which are incorporated by reference in the present disclosure.

In some embodiments, when the earphone 100 is worn, the force generated by the contact between the first surface 103 of the speaker assembly 10 and the human head may be greater than or equal to 0.1 N and less than or equal to 4.5 N, which can ensure the sound transmission efficiency and sound quality, and Iso make the function assembly 20 not against the back of the external ear during the wearing process, improving the wearing comfort.

In some embodiments, when the ear hook 30 is rigidly connected between the speaker assembly 10 and the function assembly 20, the ear hook 30 may include a rigid ear hook and the ear hook 30 may be fixedly connected to both the speaker assembly 10 and the function assembly 20. In this setup, a fixed preset angle β may be formed between the first surface 103 and the second surface 201 so that there is a gap between the function assembly 20 and the back of the external ear when the first surface 103 is fully pressed against the human head, thus avoiding the top of the function assembly 20 against the back of the external ear. In some embodiments, the preset angle β formed between the first surface 103 and the second surface 201 may be within a certain range to ensure that the function assembly 20 can be located in the space between the human head and the back of the external ear and not in contact with both the human head and the back of the external ear when the first surface 103 is fully pressed against the human head. In some embodiments, the preset angle β between the first surface 103 and the second surface 201 may be in the range of 3 degrees to 15 degrees. In some embodiments, the preset angle β between the first surface 103 and the second surface 201 may be in the range of 5 degrees to 10 degrees. In some embodiments, the preset angle β between the first surface 103 and the second surface 201 may be in the range of 5 degrees to 8 degrees.

In some embodiments, the first surface 103 may be a side on the speaker assembly 10 toward the human head, and the second surface 201 may be a side of the function assembly 20 toward the human head. In some embodiments, the first surface 103 and the second surface 201 may be planar surfaces or curved surfaces that are externally convex. When the first surface 103 and/or the second surface 201 are planar surfaces, the preset angle β may be an angle formed between the two planes of the first surface 103 and the second surface 201. When the first surface 103 and/or the second surface 201 are curved surfaces, the preset angle β may be an angle between planes that are formed by edge contour lines of the first surface 103 and the second surface 201, or the preset angle β may also be an angle between tangent planes at the top of the two curved surfaces (the side toward the top of the human head when worn).

In some embodiments, the first surface 103 may include a curved surface that is outwardly convex to increase friction when the speaker assembly 10 is affixed to the human face, thereby increasing the shock resistance of the earphone 100. In some embodiments, the curved surface may be distributed over the entire surface or a portion of the surface of the first surface 103. When the first surface 103 includes a curved surface that is convex, the curved surface may fit on the human face when the earphone 100 is in the worn state. Compared to the planar first surface 103, the curved surface can increase the contact region between the speaker assembly 10 and the human face, thus increasing the friction between the earphone 100 and the human face, and thereby preventing the earphone 100 from slipping off the human head.

In some embodiments, in conjunction with FIGS. 1 and 5, a corner of the function assembly 20 adjacent the back of the external ear may be set as a chamfered corner. The chamfered corner may include a chamfered right angle, a chamfered rounded angle, etc. The chamfered corner may be provided to leave an avoidance space between the function assembly 20 and the back of the external ear, reducing the risk of contact between the function assembly 20 and the back of the external ear and further avoiding the top of the function assembly 20 against the back of the external ear. In some embodiments, the function assembly 20 may be in the form of a block. For example, the function assembly 20 may be in the shape of a rectangular block, a square block, a column block, etc. In the case of the function assembly 20 being in the shape of a rectangular block, the second surface 201 of the function assembly 20 may have a length edge and a width edge. The length edge may be an edge on the second surface 201 that is parallel (or approximately parallel) to an extension direction of the ear hook 30. The width edge may be an edge on the second surface 201 that is perpendicular (or approximately perpendicular) to the extension direction of the ear hook 30. In some embodiments, when the length edge of the function assembly 20 is set along the extension direction of the ear hook 30, the width edge of the function assembly 20 toward the back of the external ear may be easily against the back of the external ear. In such cases, a corner of the function assembly 20 adjacent to the back of the external ear may be a corner on its width edge toward the back of the external ear, and the corner may be chamfered so as to further avoid the top of the function assembly 20 against the back of the external ear.

Figure 6:
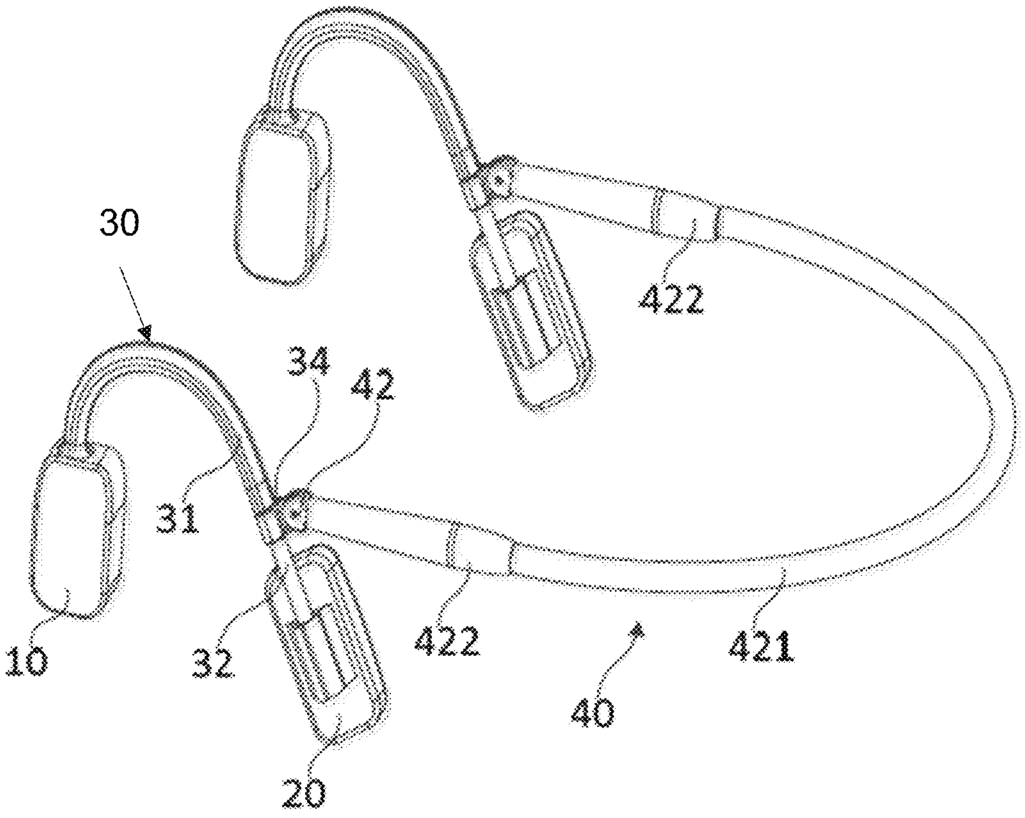
FIG. 6 is a structural diagram illustrating another exemplary earphone according to some embodiments of the present disclosure.

FIG. 6 is a structural diagram illustrating another exemplary earphone according to some embodiments of the present disclosure.

Referring to FIG. 6, the function assembly 20 may be telescopically connected to the ear hook 30. That is, the function assembly 20 may be fixedly connected to the ear hook 30 and telescoped through the structure of the ear hook 30. The telescoping of the function assembly 20 through the ear hook 30 may adjust the position of the function assembly 20 so as to avoid the top of the function assembly 20 against the back of the external ear.

In some embodiments, the ear hook 30 may include a first tube body 31 and a second tube body 32. One end of the first tube body 31 may be rigidly connected to the speaker assembly 10, the other end of the first tube body 31 may be telescopically connected to one end of the second tube body 32, and the other end of the second tube body 32 may be rigidly connected to the function assembly 20. In some embodiments, the first tube body 31 and the second tube body 32 may be slidingly sleeved. One end of the second tube body 32 (the end away from the function assembly 20) may slide into one end of the first tube body 31 (the end away from the speaker assembly 10), and the first tube body 31 and the second tube body 32 may be fixed by a fastener. The fastener may include, but is not limited to, a screw, a pin, a lock nut, etc. The fastener may limit the sliding between the first tube body 31 and the second tube body 32 when the first tube body 31 and the second tube body 32 are fixed. When the fastener is removed from the limiting effect of the first tube body 31 and the second tube body 32, the first tube body 31 and the second tube bodies 32 may slide relative to each other so that the position of the function assembly 20 on the ear hook 30 can be adjusted. After the position adjustment of the function assembly 20 is finished, the first tube body 31 and the second tube body 32 may be fixed by the fastener again.

In some embodiments, the first tube body 31 and the second tube body 32 may both be provided with restriction holes, and the fastener (e.g., a screw or pin) may be threaded into the restriction holes to fix the first tube body 31 and the second tube body 32. In some embodiments, the fastener (e.g., a lock nut) may be screwed to an end of the first tube body 31 away from the speaker assembly 10, and an end size of the first tube body 31 may be adjusted by screwing a position of the lock nut. When the end of the first tube body 31 is relatively large, the second tube body 32 may telescope and slide relative to the first tube body 31; when the end of the first tube body 31 is relatively smaller, the end of the first tube body 31 may squeeze the second tube body 32, thereby fixing the first tube body 31 and the second tube body 32.

In some embodiments, the earphone 100 may not include a rear hook 40, and the earphone 100 may rely solely on the ear hook 30 (e.g., a hook-shaped structure, a C-shaped structure, etc.) to achieve being worn on the human ear. The telescoping of the function assembly 20 by the ear hook 30 may adjust the position of the function assembly 20 to fit different human ear shapes.

Figure 7:
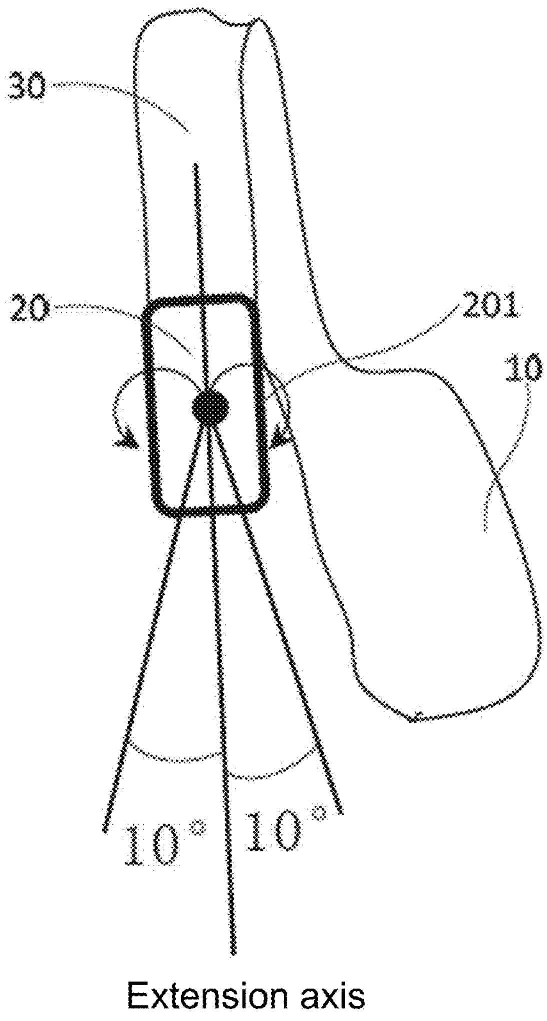
FIG. 7 is a structural schematic diagram illustrating a form of connection between the function assembly and the ear hook in FIG. 1 or FIG. 6 according to some embodiments of the present disclosure.

FIG. 7 is a structural schematic diagram illustrating a form of connection between the function assembly and the ear hook in FIG. 1 or FIG. 6 according to some embodiments of the present disclosure.

In some embodiments, referring to FIG. 7, the ear hook 30 may include a rigid ear hook or an elastic ear hook, the function assembly 20 may be flexibly connected to the ear hook 30, and the function assembly 20 may follow a deflection when the function assembly 20 is touched by an external force, so that the function assembly 20 can avoid the human head and the back of the external ear, thereby avoiding the function assembly 20 from pressing against the human head and the back of the external ear with a large pressure. In some embodiments, when the function assembly 20 is subjected to a certain force against the human head or the back of the external ear, the function assembly 20 may be deflected around an extension axis of the ear hook 30 to avoid the human head or the back of the external ear, thereby avoiding or eliminating the discomfort and pressure caused by the function assembly 20 against the back of the external ear or the human head.

In some embodiments, the function assembly 20 may be provided with a turning hole (not shown) on a side of the function assembly 20 connected to the ear hook 30, and one end of the ear hook 30 may be rotatably connected to the turning hole. The ear hook 30 may be provided with a gap between the ear hook 30 and the turning hole so that the function assembly 20 can be deflected around the ear hook 30 when the function assembly 20 is subjected to an external force, and when the back of the external ear or the human head is against the function assembly 20, the function assembly 20 can be deflected adaptively to avoid discomfort and pressure.

In some embodiments, the function assembly 20 may also include a function housing and a flexible connection member (not shown). The ear hook 30 may be flexibly connected to the function housing via the flexible connection member. In some embodiments, the flexible connection member may have a torsion threshold. The torsion threshold may refer to a threshold for a force that can cause the flexible connection member to twist. When the external force subjected to the flexible connection member reaches the torsion threshold, the flexible connection member can be deflected by a certain angle. In some embodiments, the flexible connection member may include a torsion spring, a damped swivel, etc. In some embodiments, the flexible connection member may include the torsion spring. The torsion spring may be threaded onto the ear hook 30, and the torsion spring may work together with the function housing. The function housing may be deflected around the extension axis of the ear hook 30 when the external force subjected to the function assembly 20 reaches the torsion threshold of the torsion spring. In some embodiments, the torsion threshold of the torsion spring may be set to be small so that the force generated by the function housing in contact with the human head or the back of the external ear does not cause pressure to deflect the function assembly 20. In some embodiments, the torsion threshold of the torsion spring may be adjusted by designing structural parameters (e.g., a size, a material, etc.) of the torsion spring.

In some embodiments, the flexible connection member may include a damped swivel. One end of the damped swivel may be connected to the function housing and the other end of the damped swivel may be connected to the ear hook 30. When the external force subjected to the function assembly 20 reaches the torsion threshold of the damped swivel, the function assembly 20 may be deflected by the damped swivel, and thereafter the function assembly 20 may remain fixed relative to the ear hook 30. In some embodiments, a threshold of the damped swivel may also be set such that the external force does not cause pressure to deflect the function assembly 20. In some embodiments, the torsion threshold of the damped swivel may be adjusted by designing structural parameters (e.g., a size, a material, etc.) of the damped swivel.

In some embodiments, a deflection angle of the function assembly 20 relative to the ear hook 30 may be within a range of positive and negative preset threshold angles. When the function assembly 20 is not deflected, the deflection angle may be 0 degree, and the deflection of the function assembly 20 closer to the head or away from the head may be defined as a positive or reverse deflection with a corresponding positive or negative deflection angle.

In some embodiments, in a state where the function assembly 20 is not in contact with the human head and ear, the second surface 201 of the function assembly 20 toward the human head may be in a first position; in a worn state of the function assembly 20, the second surface 201 of the function assembly 20 toward the human head may be in a second position. The deflection angle between the second surfaces 201 of the function assembly 20 toward the human head at the first position and the second position may be within the range of positive and negative preset threshold angles. In other words, in the worn state, the function assembly 20 may not be in contact with the human head and ear, the function assembly 20 may not be deflected, and the second surface 201 of the function assembly 20 toward the human head may be in the first position with a deflection angle of 0 degree; in the worn state, the function assembly 20 may be in contact with the human head and ear deflected, in which cases, the second surface 201 may be in the second position, and the deflection angle between the second surfaces 201 at the first position and the second position may be within the range of positive and negative preset threshold angles. In some embodiments, the preset threshold angle may be in a range of 10 degrees to 20 degrees. For example, the preset threshold angle may be 10 degrees, 14 degrees, 17 degrees, 20 degrees, etc. In some embodiments, the preset threshold angle may be 10 degrees and the deflection angle of the function assembly 20 relative to the ear hook 30 may be in the range of plus or minus 10 degrees. For example, the function assembly 20 may be deflected 5 degrees, 6 degrees, or 8 degrees, etc., in a positive or negative direction relative to the ear hook 30. In some embodiments, the function assembly 20 may also be capable of deflecting only to a side close to the human head or deflecting only to a side away from the human head, and the deflection angle between the second surfaces 201 of the function assembly 20 toward the human head at the first position and the second position may be within a range of 0 degree to the preset threshold angle.

In some embodiments, a corner of the function assembly 20 adjacent to the back of the external ear may be set as a chamfered corner to avoid the top of the function assembly 20 against the back of the external ear, more descriptions regarding the chamfered corner setting can be found in the previous description.

Figure 8:
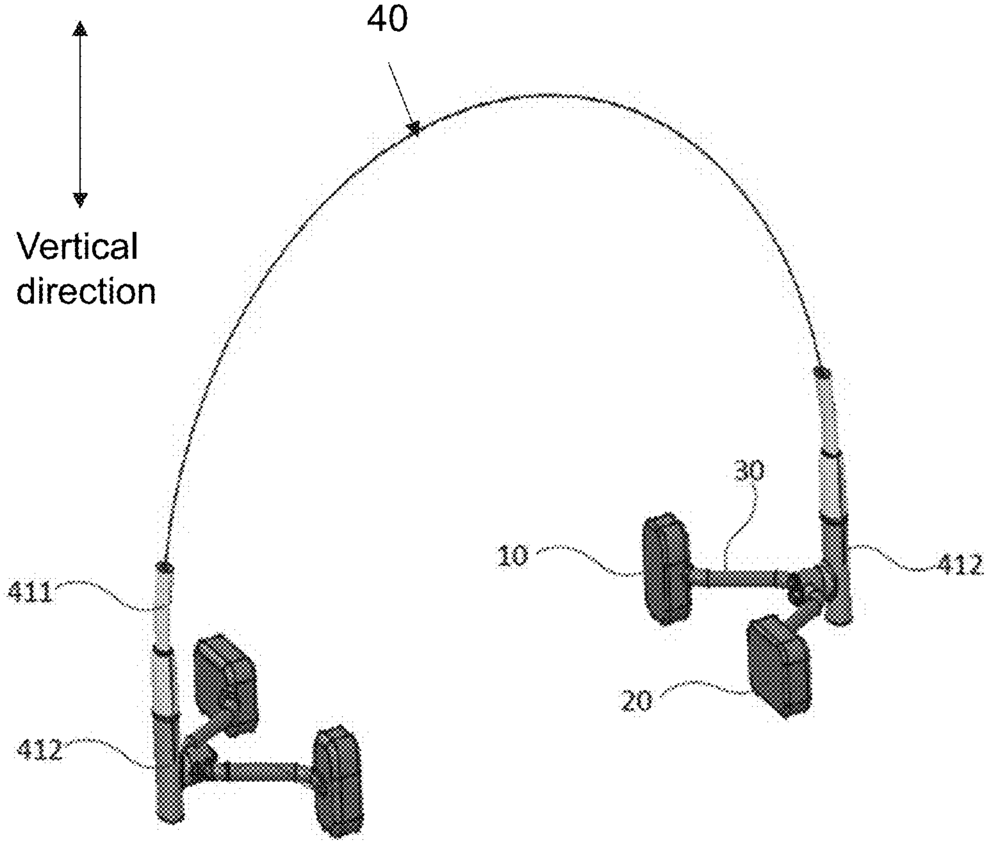
FIG. 8 is a structural diagram illustrating another exemplary earphone according to some embodiments of the present disclosure.

FIG. 8 is a structural diagram illustrating another exemplary earphone according to some embodiments of the present disclosure. In some embodiments, referring to FIGS. 6 and 8, the rear hook 40 may be connected between two groups of function assemblies 20 or two groups of ear hooks 30. For example, in FIG. 6, the rear hook 40 may be connected between the two groups of function assemblies 20. For example, in FIG. 8, the rear hook 40 may be connected between the two groups of ear hooks 30. In a worn state, the rear hook 40 may be located at the back of the head (as shown in FIG. 6) or at the top of the head (as shown in FIG. 8). In some embodiments, the rear hook 40 may be fixedly connected to the function assembly 20 or the ear hook 30, i.e., the rear hook 40 may not be adjustable. The rear hook 40 may be fixedly connected to the function assembly 20 or the ear hook 30 by integral injection molding, bonding, threaded connection, etc.

In some embodiments, a position of the rear hook 40 relative to the function assembly 20 may be adjustable so as to adjust the attitude of the rear hook 40, change the position of a mass center of the rear hook 40, and adjust a torque generated by the rear hook 40 to achieve a balance of a torque of the earphone 100 about a support position, and increase the wearing stability of the earphone 100. In some embodiments, merely by way of example, the rear hook 40 may be rotatably connected to the function assembly 20 or the ear hook 30.

In some embodiments, referring to FIG. 8, the rear hook 40 may be connected to the two groups of ear hooks 30 and configured to be worn on top of the head. The ear hooks 30 may be connected between the speaker assembly 10 and the functional assembly 20, and the ear hooks 30 may only serve as a connection without being supported on the ears. In a worn state, the rear hook 40 may be supported on the top of the head. That is, when the earphone 100 is worn on the human head, a support point of the earphone 100 may be on the rear hook 40. In a stable worn state of the earphone 100, a torque generated by the speaker assembly 10 and a torque generated by the function assembly 20 may be balanced about the support point on the rear hook 40.

Figure 9:
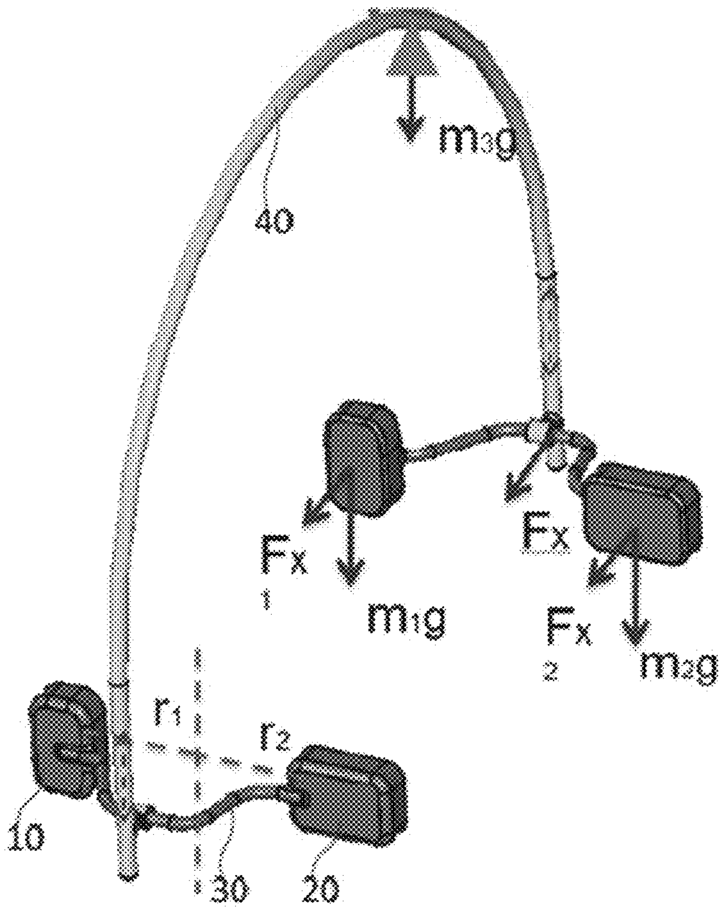
FIG. 9 is a schematic diagram illustrating a torque balance of the earphone in FIG. 8 in a worn state according to some embodiments of the present disclosure.

FIG. 9 is a schematic diagram illustrating a torque balance of the earphone in FIG. 8 in a worn state according to some embodiments of the present disclosure.

As shown in FIG. 9, the rear hook 40 may be worn on the top of the head, a weight of the earphone 100 may be balanced by a support force provided by the human head, and the support point of the earphone 100 may be on the rear hook 40, at which point the torque of the earphone about the support point may meet equation (1):

$$m_1 g^* r_1 = m_2 g^* r_2 \quad (1)$$

where, $m_1$ denotes the mass of the individual speaker assembly 10, $m_2$ denotes the mass of the individual function assembly 20, $r_1$ denotes a force arm from the mass center of the speaker assembly 10 to the support point on the rear hook 40, $r_2$ denotes a force arm from the mass center of the function assembly 20 to the support point on the rear hook 40, and g denotes the universal gravitational constant.

In some embodiments, by changing a spatial form of the connection of the rear hook 40, from a parallel rear hook under wear to an upright vertical rear hook, the weight of the whole earphone may be carried by the rear hook 40, so that the support point of the earphone 100 may be located on the rear hook 40, thus the balance force arm at the support point of the earphone 100 by the mass center of the rear hook 40 can be eliminated, and only the speaker assembly 10 and the function assembly 20 can achieve the torque balance in the worn state. The parallel rear hook may refer to that in the worn state, a plane of the rear hook is perpendicular or approximately perpendicular to a body height direction. The upright vertical rear hook may refer to that in the worn state, a plane of the rear hook is parallel or approximately parallel to the body height.

In some embodiments, as shown in FIG. 8, the rear hook 40 may include a first headwear portion 411 and two second headwear portions 412. For each of the two second headwear portions 412, one end of the second headwear portion 412 may be rotatably connected to one end of the first headwear portion 411, and the other end of the second headwear portion 412 may be connected to the ear hook 30. In the worn state, the second headwear portions 412 may be rotated in a vertical direction relative to the first headwear portion 411, and a rotation angle may be adjusted to provide a better fit of the sound assembly 10 and the function assembly 20 that are connected to the ear hook 30 for the human head. In some embodiments, the rotation angle may be in a range of plus or minus 10 degrees. In some embodiments, the rotation angle may be in the range of plus or minus 8 degrees. In some embodiments, the rotation angle may be in the range of plus or minus 5 degrees.

In some embodiments, in terms of force analysis, when the support point of the earphone 100 is at the top of the head, and the ear hook 30, the speaker assembly 10, and the function assembly 20 on both sides are set symmetrically, the earphone 100 can achieve the torque balance more easily, and also can be easily fine-tuned based on the difference of the human heads to obtain a good wearing effect and improve the wearing stability of the earphone 100.

In some embodiments, the function assembly 20 may be in the form of a block (e.g., as described in FIG. 6). A surface of the function assembly 20 that is connected to the ear hook 30 may have two width sides (i.e., two sides distributed along a width direction of a surface of the function assembly 20 that is connected to the ear hook 30) and two length sides (i.e., two sides distributed along a length direction of the surface of the function assembly 20 that is connected to the ear hook 30). The two width sides may be disposed at intervals and the two length sides may also be disposed at intervals. One end of the ear hook 30 may be connected to a width side of the function assembly 20. When the rear hook 40 is flexibly connected between the two groups of ear hooks 30, a mass of the speaker assembly 10 may be greater than a mass of the function assembly 20 and the rear hook 40 to facilitate balance adjustment of the earphone 100. In some embodiments, the function assembly 20 may be in the shape of a block. One end of the ear hook 30 may be connected to a width side of the function assembly 20. In such cases, the function assembly 20 may be set in a horizontal type.

Figure 10:
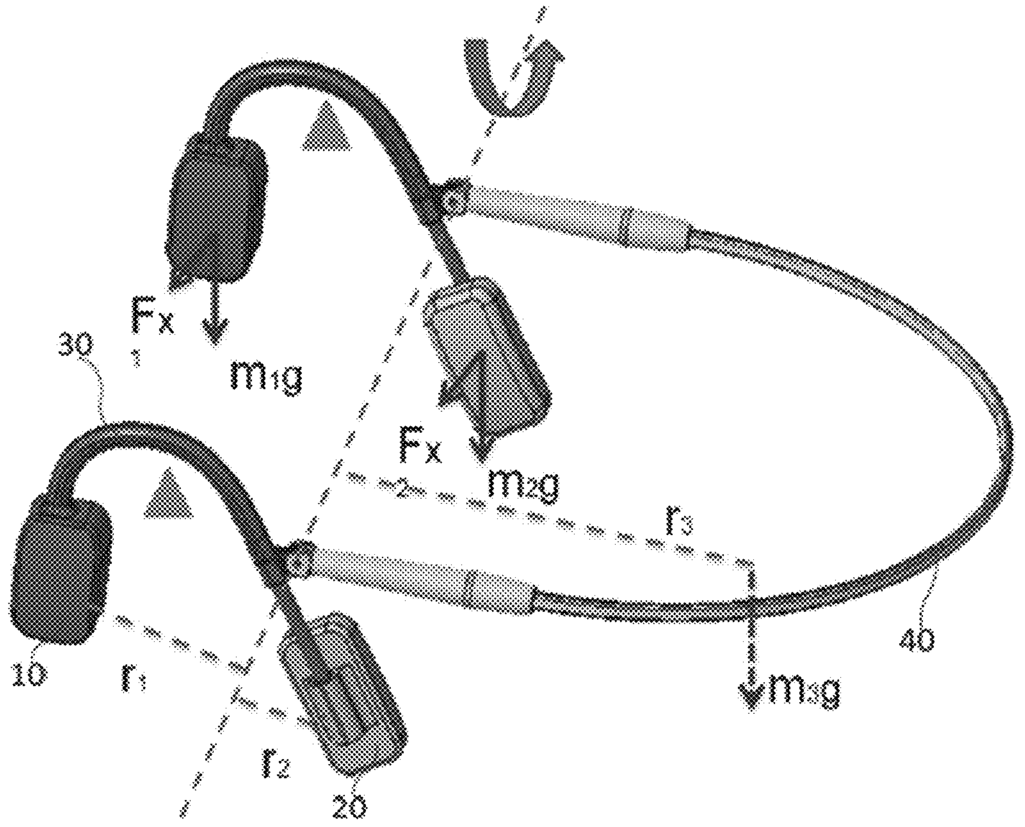
FIG. 10 is a schematic diagram illustrating a torque balance of the earphone in FIG. 6 in a worn state according to some embodiments of the present disclosure.

FIG. 10 is a schematic diagram illustrating a torque balance of the earphone in in FIG. 6 the worn state according to some embodiments of the present disclosure.

In some embodiments, the support point of the earphone 100 may also be located on the ear hook 30. As shown in FIG. 10, in the worn state, the ear hook 30 may be supported on the human ear, and the rear hook 40 may be located behind the head. The weight of the earphone 100 may be mainly balanced by a support force provided by the human ear to the ear hook 30, and the support point of the earphone 100 may be on the ear hook 30. In such cases, a torque generated by the two groups of speaker assemblies 10 may be balanced with a torque generated by the two groups of function assemblies 20 and rear hook 40, and the torque of the earphone about the support point may meet equation (2):

$$m_1g*r_1=m_2g*r_2+m_3g*r_3 \quad (2)$$

where, $m_3$ denotes the mass of the rear hook 40 and $r_3$ denotes the force arm from the mass center of the rear hook 40 to the support point on the ear hook 30.

In some embodiments, the rear hook 40 may be rotatably connected to the ear hook 30. Specifically, as shown in FIG. 6, the ear hook 30 may be provided with a first hinged panel 34, and the rear hook 40 may be provided with a second hinged panel 42 at an end of the rear hook 40. The first hinged panel 34 and the second hinged panel 42 may be connected by a pivot. By rotating and adjusting the attitude of the rear hook 40, a mass center position of the rear hook 40 may be changed. The ear hook 30 may be configured to support on the human ear. That is, a contact position between the ear hook 30 and the human ear may be as a support point, and the speaker assembly 10 and the function assembly 20 may be located on two sides of the support point to facilitate the torque balance. Meanwhile, by the adjustment of the rear hook 40, it is more conducive to achieve the torque balance for different human heads, thus facilitating the wearing stability of the earphone 100.

In some embodiments, referring further to FIG. 6, the function assembly 20 may be telescopically connected to the ear hook 30, and a position of the function assembly 20 may be adjusted by telescoping the function assembly 20 on the ear hook 30, such that the force arms of the function assembly 20 and the rear hook 40 relative to the support point on the ear hook 30 can reach the torque balance, thereby increasing the wearing stability of the earphone 100. In such cases, the rear hook 40 may include a first sliding portion 421 and two second sliding portions 422 Two ends of the first sliding portion 421 may be slidingly connected to the two second sliding portions 422. One end of the second sliding portion 422 may be provided with the second hinged panel 42 and be hinged to the ear hook 30 to further assist the function assembly 20 and the rear hook 40 to achieve the torque balance with respect to the force arm of the support point on the ear hook 30.

In some embodiments, when the support point of the earphone 100 is located on the ear hook 30, the earphone 100 may also not include a rear hook 40. The earphone 100 may rely solely on the ear hook 30 (e.g., a hook structure, a C-shaped structure, etc.) to achieve being worn on the human ear, and a torque generated by the speaker assembly 10 located on the same side of the human head may be balanced by a torque generated by the corresponding function assembly 20.

Figure 11:
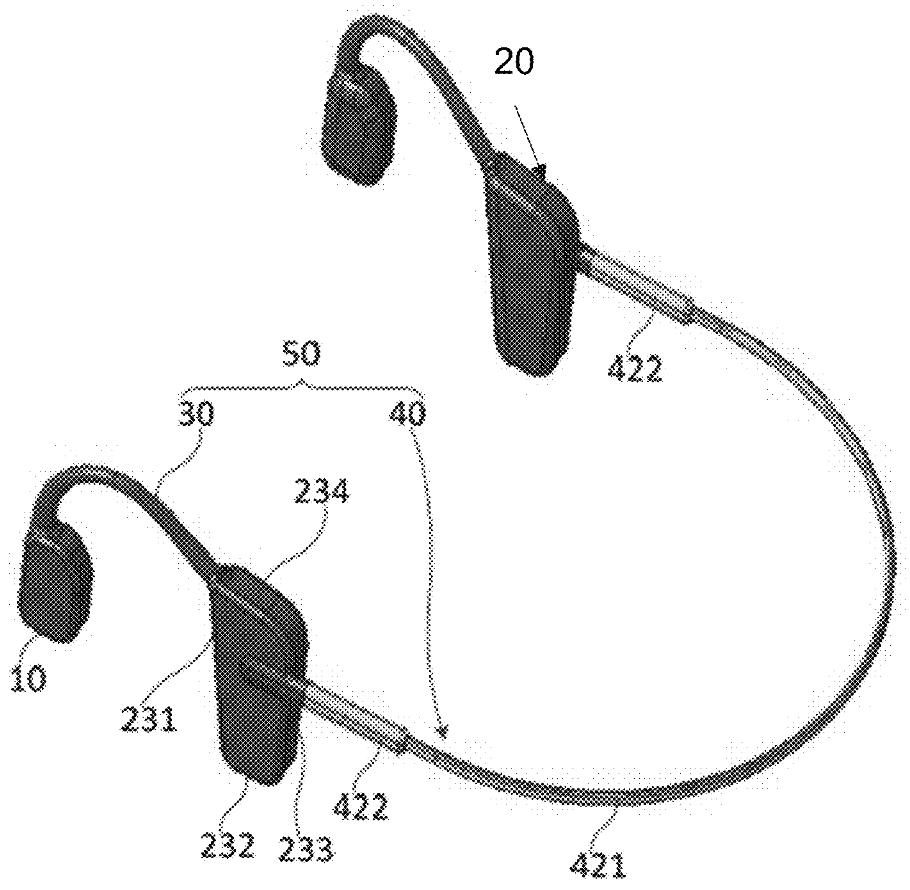
FIG. 11 is a structural diagram illustrating another exemplary earphone according to some embodiments of the present disclosure.
Figure 12:
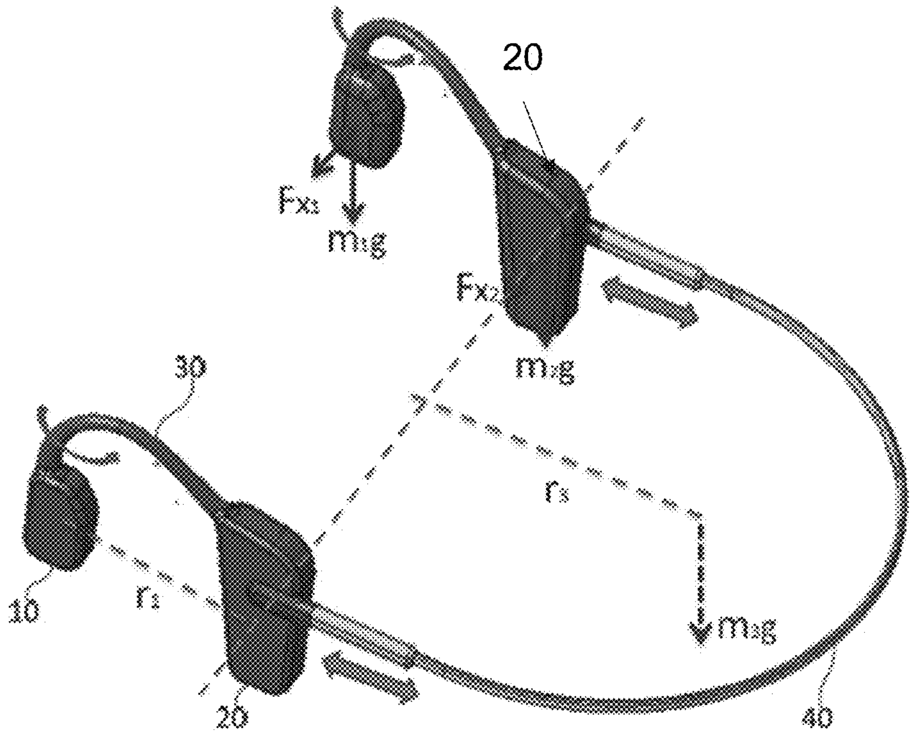
FIG. 12 is a schematic diagram illustrating a torque balance of the earphone in FIG. 11 in a worn state according to some embodiments of the present disclosure.

FIG. 11 is a structural diagram illustrating another exemplary earphone according to some embodiments of the present disclosure. FIG. 12 is a schematic diagram illustrating a torque balance of the earphone in FIG. 11 in a worn state according to some embodiments of the present disclosure.

In some embodiments, the support point of the earphone 100 may also be located on the function assembly 20. Referring to FIG. 11, the function assembly 20 may be in the shape of a block, and the rear hook 40 may be connected to two length sides of the function assembly 20. In such cases, the function assembly 20 may be set in a vertical type. The rear hook 40 may be telescopically connected to the function assembly 20, which can facilitate the function assembly 20 to be clamped on the human head. In some embodiments, the two groups of function assemblies 20 may be configured for clamping on both sides of the human head, i.e., the function assembly 20 may be used as a main support point. In such cases, the balance force arm of the mass center of the function assembly 20 on the support point may be almost disregarded. The clamping force of the speaker assembly 10 may be provided by the ear hook 30 alone, and the positive pressure provided by the rear hook 40 to the function assembly 20 in contact with the human head may generate a frictional force that balances the gravity of the earphone 100.

Referring to FIG. 12, in some embodiments, both ends of the rear hook 40 may also be slidingly connected to the corresponding function assembly 20, respectively, and be capable of being slidingly adjusted along the width side of the function assembly 20 (the sliding direction is shown by the arrow in FIG. 12). The rear hook 40 may be capable of adjusting the position of the rear hook 40 relative to the function assembly 20 during the sliding process. In some embodiments, the width direction of the function assembly 20 (the arrow direction in FIG. 12) may be provided with a slideway, and an end of the rear hook 40 may be provided with a slider. The slider may be slidingly assembled in the slideway so as to realize the sliding of the rear hook 40 relative to the function assembly 20. In some embodiments, the width direction of the function assembly 20 may also be provided with a guide block, and the end of the rear hook 40 may be connected with a guide shaft. The guide shaft may be slidingly assembled with the guide block, so as to realize the sliding of the rear hook 40 relative to the function assembly 20. In some embodiments, the function assembly 20 may be tightened on the human head by the elasticity provided by the rear hook 40, and the position of the function assembly 20 in contact with the human head may be a support point. By adjusting the rear hook 40 and the speaker assembly 10 about the support point on the function assembly 20 to achieve the torque balance, which can increase the wearing stability of the earphone 100.

In the worn state, a torque from the two groups of speaker assemblies 10 to the corresponding function assemblies 20 may be balanced with a torque from the rear hook 40 to the function assemblies 20, i.e., a torque generated from the mass center of the speaker assemblies 10 to the support point may be equal to a torque generated from the mass center of the rear hook 40 to the support point. Specifically, as shown in FIG. 12, the rear hook 40 may provide elastic force and make the two groups of function assemblies 20 in the worn state clamped on both sides of the human head, and then the gravity of the earphone 100 may be mainly balanced by the friction between the function assemblies 20 and the human head. That is, the support point of the earphone 100 may be located on the function assemblies 20. In such cases, the earphone about the support point may meet equation (3):

$$m_1g*r_1=m_3g*r_3 \quad (3)$$

where, $m_3$ denotes the mass of the rear hook 40 and $r_3$ denotes the force arm from the mass center of the rear hook 40 to the support point. It should be noted that the mass of the ear hook 30 may be very small compared to the mass of the speaker assembly 10, and the force arm from the mass center to the support point may also be short, so the torque generated by the ear hook 30 may be not of the same order of magnitude as the torque generated by the speaker assembly 10 and can be neglected.

In some embodiments, a contact area between the function assembly 20 and the human head may also be relatively enlarged to reduce the pressure caused by the function assembly 20 on the human head and improve the wearing comfort. In some embodiments, the side of the function assembly 20 toward the human head may be adapted to a corresponding region of the human head, i.e., the side of the function assembly 20 toward the human head may be designed by profile modeling so that the function assembly 20 fits more snugly on the human head, thereby increasing the contact area of the function assembly 20 with the human head. For example, the side of the function assembly 20 toward the human head may be recessed to fit the human head. As another example, the side of the function assembly 20 toward the human head may be provided with an elastic layer via which the contact area of the function assembly 20 with the human head may be increased.

Figure 13:
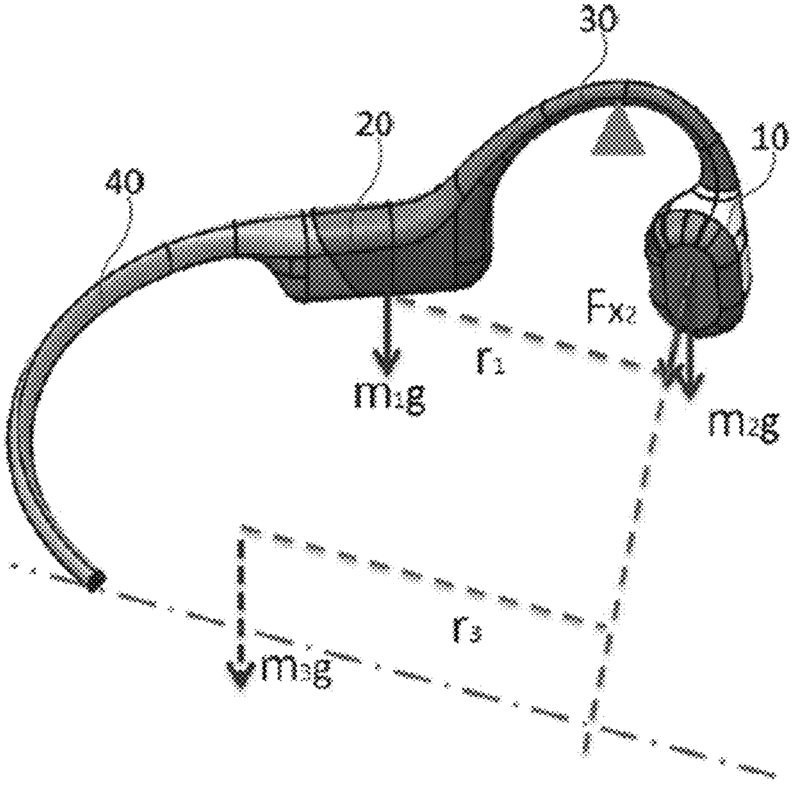
FIG. 13 is a schematic diagram illustrating a torque balance of another earphone in a worn state according to some embodiments of the present disclosure.

FIG. 13 is a schematic diagram illustrating a torque balance of another earphone in a worn state according to some embodiments of the present disclosure.

In some embodiments, as shown in FIG. 13, the function assembly 20 may be in the shape of a block. The rear hook 40 and the ear hook 30 may be connected to the two width sides of the function assembly 20. The function assembly 20 may be set in a horizontal type. The rear hook 40 may be fixedly connected or telescopically connected to the function assembly 20. The mass of the rear hook 40 and the mass of the function assembly 20 may be less than the mass of the speaker assembly 10.

In some embodiments, in the worn state, the ear hook 30 may be supported on the human ear, and the support point of the earphone 100 may be on the ear hook 30. The two groups of speaker assemblies 10 may be clamped on two sides of the human head. The function assembly 20 may be not in contact with the human head. A torque generated by the two groups of speaker assemblies 10 may be balanced with a torque generated by the rear hook 40 and the function assembly 20. In such cases, the torque of the earphone about the support point may meet equation (4):

$$m_1g*r_1+m_3g*r_3=M_1 \tag{4}$$

where, $M_1$ denotes the torque generated by the speaker assembly 10, including the torque generated by the gravity of the speaker assembly 10 and the frictional force between the speaker assembly 10 and the human head.

Figure 14:
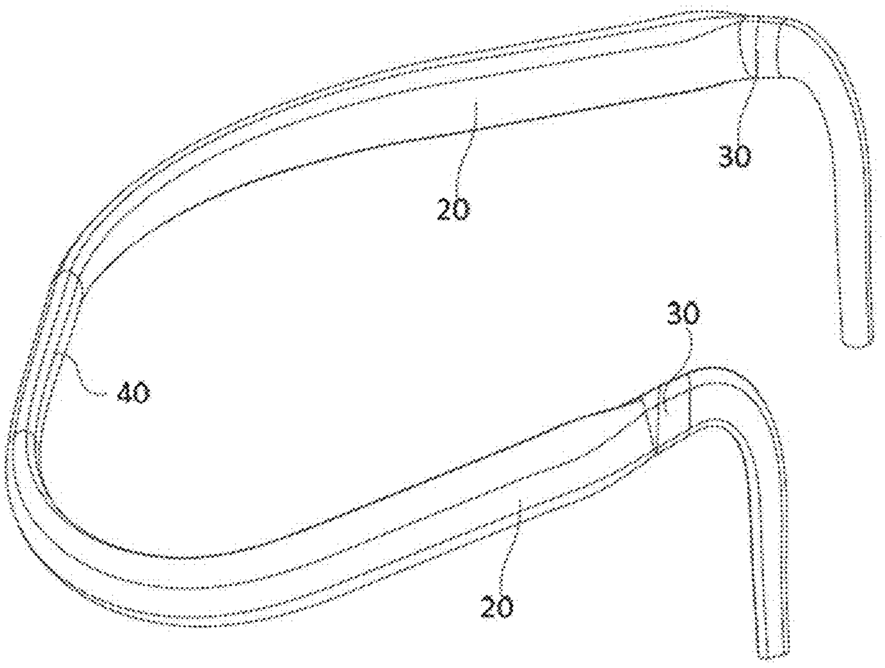
FIG. 14 is a structural diagram illustrating another exemplary earphone according to some embodiments of the present disclosure.

FIG. 14 is a structural diagram illustrating another exemplary earphone according to some embodiments of the present disclosure.

In some embodiments, referring to FIG. 14, the ear hook 30 may be connected between the speaker assembly (not shown) and the function assembly 20. The function assembly 20 may be connected to one end of the ear hook 30 and the function assembly 20 and the ear hook 30 may be set in a streamlined shape. In some embodiments, a cross-section of the function assembly 20 transitioning to the ear hook 30 may be graduated and the function assembly 20 may be provided substantially in the extension direction of the ear hook 30. The function assembly 20 may have no more obvious areas protruding relative to the ear hook 30. It can also be understood that the function assembly 20 and the ear hook 30 have substantially the same cross-section along the extension direction, with only slight differences in sizes. The streamlined shape of the function assembly 20 and the ear hook 30 may prevent discomfort and pressure caused by the function assembly 20 squeezing the back of the ear. In some embodiments, the function assembly 20 may have a certain slope relative to the ear hook 30 to ensure that the function assembly 20 does not cause pressure on the back of the ear. In some embodiments, the slope of the function assembly 20 relative to the ear hook 30 may be in a range of 0 degrees to 20 degrees. In some embodiments, the slope of the function assembly 20 relative to the ear hook 30 may be in the range of 0 degrees to 15 degrees. In some embodiments, the slope of the function assembly 20 relative to the ear hook 30 may be in the range of 0 degrees to 10 degrees. In some embodiments, the slope of each point at the circumference direction of the function assembly 20 relative to the ear hook 30 may be within a suitable range (e.g., 0 degrees to 15 degrees), such that the function assembly 20 can be set in a streamlined shape with respect to the ear hook 30.

In some embodiments, the function assembly 20 may have a length along the extension direction of the ear hook 30 that is greater than the body size of the function assembly 20 along a direction perpendicular to the extension direction. The body size may be a width size, a thickness size, a radial size, etc. This set-up can result in the function assembly 20 being elongated in the extension direction to facilitate a streamlined set-up with the ear hook 30. In some embodiments, a ratio of a length size of the function assembly 20 along the extension direction of the ear hook 30 to the body size of the function assembly 20 along the direction perpendicular to the extension direction may be less than 10. For example, the ratio of the length size to the body size is 6, and the body size may include a width size and a thickness size. The width size may be 6 mm, the thickness size may be 8 mm, and the length size may be 36 mm. In some embodiments, the ratio of the length size of the function assembly 20 along the extension direction of the ear hook 30 to the body size of the function assembly 20 along the direction perpendicular to the extension direction may be less than 8. In some embodiments, the ratio of the length size of the function assembly 20 along the extension direction of the ear hook 30 to the body size of the function assembly 20 along the direction perpendicular to the extension direction may be less than 5. In some embodiments, the body size may be less than or equal to 10 mm, and the width size of a battery or circuit board in the function assembly 20 may be less than 10 mm, which distinguishes the battery or circuit board in the function assembly 20 from existing batteries or circuit boards with large width sizes.

In this embodiment, the function assembly 20 may have a body size of 8 mm and a length size of 40 mm. The rear hook 40 may be connected between the two groups of function assemblies 20, and the rear hook 40 may be connected to an end of the function assembly 20 that is away from the ear hook 30 and may beset in a streamlined shape with the function assembly 20. The slope of the function assembly 20 with respect to the rear hook 40 may be in a range of 0 degrees to 15 degrees. In some embodiments, the two groups of ear hooks 30, the two groups of function assemblies 20, and the rear hook 40 may be an integrated design. In other words, by designing the ear hooks 30, the rear hook 40 and the function assemblies 20 to have approximately the same size, the function assemblies 20 may be connected to one end of the ear hooks 30 and one end of the rear hook 40, and the slope between the function assemblies 20 and the ear hooks 30 and the slope between the function assemblies 20 and the rear hook 40 may be relatively small, thus making them streamlined in their entirety without visible bulges in their shapes. In some embodiments, the earphone 100 may also not include the rear hook 40, and the earphone 100 may be worn on the human ear only by the ear hook 30 (e.g., a hook structure, a C-shaped structure, etc.), and the speaker assembly 10, the function assembly 20, and the ear hook 30 may be set in a streamlined shape.

Figure 15:
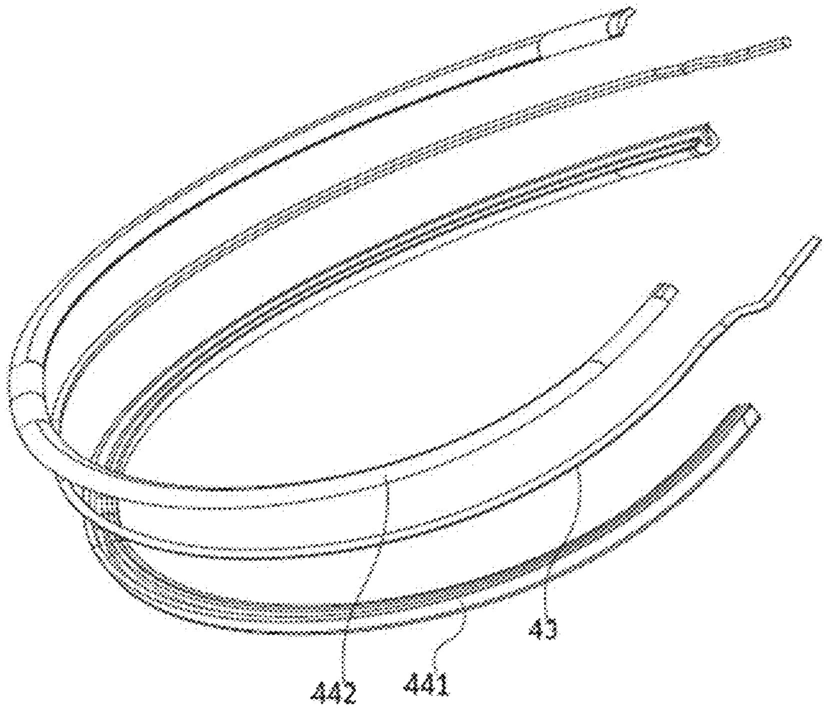
FIG. 15 is a schematic diagram illustrating an exploded structure of a rear hook according to some embodiments of the present disclosure.

FIG. 15 is a schematic diagram illustrating an exploded structure of a rear hook according to some embodiments of the present disclosure.

In some embodiments, in conjunction with FIG. 11 and FIG. 15, the earphone may further include a support structure 50. The support structure 50 may be connected to the speaker assembly 10 and the function assembly 20. The support structure 50 may be provided with a metal body 43 within the support structure 50, which is electrically connected to the function assembly 20 to serve as an antenna for the earphone 100.

In some embodiments, as shown in FIG. 11, the support structure 50 may include the ear hook 30 and the rear hook 40 as described above. The ear hook 30 may be connected between the speaker assembly 10 and the function assembly 20, and the rear hook 40 may be connected between the two groups of function assemblies 20. The rear hook 40 and/or ear hook 30 may be provided with the metal body 43, which is electrically connected to the function assembly 20 to serve as an antenna for the earphone 100. In some embodiments, the metal body 43 may have a certain length, and the metal body 43 may be configured to convert a changing current and a changing magnetic field to enable the transmission and reception of signals. Based on this, the metal body 43 may be used as an antenna.

In some embodiments, the rear hook 40 may be provided with the metal body 43 within the rear hook 40. At least one end of the metal body 43 may be electrically connected to the function assembly 20. In some embodiments, the metal body 43 may be integral. One end of the metal body 43 may be electrically connected to one group of function assemblies 20 and the other end of the metal body 43 may be not electrically connected to another group of function assemblies 20; or each end of the metal body 43 may be electrically connected to a corresponding group of function assemblies 20. In some embodiments, the metal body 43 may also be split and each of the splinters thereof may be electrically connected to a group of function assemblies 20 separately.

Specifically, referring to FIG. 15, the rear hook 40 may include a first rear hook housing 441, a second rear hook housing 442, and the metal body 43. The metal body 43 may be disposed in a space formed by snapping the first rear hook housing 441 and the second rear hook housing 442 together. The metal body 43 may be electrically connected to the function assembly 20 to serve as the antenna of the earphone 100, i.e., the metal body 43 provided in the rear hook 40 may be used as an antenna to send and receive communication signals, thus avoiding the need to provide an antenna in the function assembly 20 or the speaker assembly 10, thereby reducing the size of the function assembly 20 or the speaker assembly 10, and facilitating the streamlined setting of the function assembly 20 and the ear hook 30. In some embodiments, the metal body 43 may include a whole metal wire, and the two ends of the metal body 43 may be electrically connected to the two groups of function assemblies 20. In some embodiments, a length of the metal body 43 may be greater than or equal to 30 mm for better signal transmission and reception. In some embodiments, the length of the metal body 43 may be greater than or equal to 35 mm for better signal transmission and reception. In some embodiments, the length of the metal body 43 may be greater than or equal to 40 mm for better signal transmission and reception.

In some embodiments, the metal body 43 may be split. The metal body 43 may include a first sub-antenna (not shown) and a second sub-antenna (not shown). The first sub-antenna and the second sub-antenna may be electrically connected to the corresponding function assembly 20, respectively, and the first sub-antenna and the second sub-antenna may be disposed at intervals. The first sub-antenna and the second sub-antenna may be provided in the rear hook 40. In some embodiments, the lengths of both the first sub-antenna and the second sub-antenna may be greater than or equal to 30 mm for better signal transmission and reception. In some embodiments, the lengths of the first sub-antenna and the second sub-antenna may be equal or unequal.

In some embodiments, the ear hook 30 may also be provided with the metal body 43 within the ear hook 30, and one end of the metal body 43 may be electrically connected to the function assembly 20. In some embodiments, the metal body 43 may include a whole metal wire. In some embodiments, the length of the metal body 43 may be greater than or equal to 30 mm for better signal transmission and reception. In some embodiments, the length of the metal body 43 may be greater than or equal to 35 mm for better signal transmission and reception. In some embodiments, the earphone 100 may also not include the rear hook 40, and the metal body 43 may be provided only in the ear hook 30.

In some embodiments, an end of the metal body 43 may be covered with a weld metal layer, and the metal body 43 may be welded to a circuit board in the function assembly 20 by the weld metal layer. In some embodiments, the metal body 43 may include a titanium wire and the weld metal layer may include a galvanized layer. Since the titanium wire is difficult to weld directly to the circuit board, a welding metal layer that can be easily welded to the circuit board may be plated on an end of the metal body 43 for easily electrically connecting the metal body 43 to the circuit board. In some embodiments, the metal body 43 may also include spring steel, titanium alloy, titanium-nickel alloy or chromium-molybdenum steel and other metals, and the welding metal layer may also include a copper-plated layer, etc., which are not limited in the present disclosure.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment," "an embodiment," and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Further, it can be understood by those skilled in the art that aspects of the present disclosure may be illustrated and described by a number of patentable categories or situations, including any new and useful combination of processes, machines, products, or substances, or any new and useful improvements thereof. Accordingly, aspects of the present disclosure may be performed entirely by hardware, may be performed entirely by software (including firmware, resident software, microcode, etc.), or may be performed by a combination of hardware and software. Each of the above hardware or software may be referred to as a "data block," "module," "engine," "unit," "component," or "assembly." In addition, aspects of the present disclosure may be represented as a computer product located in one or more computer readable media, which includes computer readable program code.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately," "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. An earphone, comprising:

a speaker assembly configured to contact with a human head and transmit sound;

a function assembly electrically connected to the speaker assembly and configured to control the speaker assembly; and an ear hook connected between the speaker assembly and the function assembly, so that a preset angle is formed between a first surface of the speaker assembly toward the human head and a second surface of the function assembly toward the human head, and a force generated by a contact between the first surface and the human head is greater than or equal to 0.1 N and less than or equal to 4.5 N, wherein an attitude or position of the speaker assembly or the function assembly is adjustable with respect to the ear hook, and the preset angle is in a range of 5 degrees to 10 degrees.

2. The earphone of claim 1, wherein the first surface includes a curved surface that is outwardly convex.

3. The earphone of claim 1, wherein the function assembly is provided with a chamfered corner adjacent to a back side of a human ear.

4. The earphone of claim 1, wherein the function assembly is flexibly connected to the ear hook, and the function assembly follows a deflection when the function assembly is touched by an external force.

5. The earphone of claim 4, wherein the function assembly is provided with a turning hole, and one end of the ear hook is rotatably connected to the turning hole.

6. The earphone of claim 4, wherein in a state where the function assembly is not in contact with the human head and a human ear, a surface of the function assembly toward the human head is in a first position; in a state where the function assembly is worn, a surface of the function assembly toward the human head is in a second position, wherein a deflection angle between the surfaces of the function assembly at the first position and the second position toward the human head is within a range of 0 degrees to a preset threshold angle.

7. The earphone of claim 6, wherein a value of the preset threshold angle is in a range of 10 degrees to 20 degrees.

8. The earphone of claim 6, wherein the function assembly is deflected toward a side close to the human head and/or deflected toward a side away from the human head.

9. The earphone of claim 1, wherein the speaker assembly is adjustable in attitude with respect to the ear hook.

10. The earphone of claim 9, wherein a side of the speaker assembly away from the human head is flexibly connected to one end of the ear hook.

11. The earphone of claim 9, wherein a side edge of the speaker assembly toward the human head is provided with an adhesive layer, the adhesive layer being configured to affix to the human head.

12. The earphone of claim 9, wherein a side edge of the speaker assembly toward the human head is provided with an anti-slip member.

13. The earphone of claim 1, wherein the speaker assembly, the function assembly, and the ear hook are provided in two groups correspondingly located on left and right sides of the human head, and the earphone further includes:

a rear hook connected between two groups of the function assemblies or two groups of the ear hooks, a position of the rear hook being adjustable with respect to the function assemblies.

14. The earphone of claim 13, wherein the function assembly is in a form of a block, one end of the ear hook is connected to a width side edge of the function assembly, and the rear hook is flexibly connected between two groups of the ear hooks, wherein a total mass of the speaker assembly is greater than a total mass of the function assembly and the rear hook.

15. The earphone of claim 14, wherein, in a worn state, the ear hook is supported on a human ear and a torque generated by the two groups of the speaker assemblies is balanced with a torque generated by the two groups of the functional assemblies and the rear hooks.

16. The earphone of claim 15, wherein a torque generated from the two groups of the speaker assembly to support points of the ear hooks on the human ear is balanced with a torque generated from the two groups of the function assemblies and the rear hooks to the support points of the ear hooks on the human ear.

17. The earphone of claim 13, wherein the rear hook is connected between two groups of the ear hooks, and in the worn state, the rear hook is supported on a top of the human head, the rear hook including a first headwear portion and two second headwear portions, one end of each of the two second headwear portions being rotatably connected to one end of the first headwear portion, and the second headwear portions being further connected to the ear hooks; wherein in the worn state, the second headwear portions are rotatable in a vertical direction with respect to the first headwear portion.

18. The earphone of claim 13, wherein the function assembly is connected to one end of the ear hook and is provided in a streamlined shape with the ear hook, and each of two ends of the rear hook is connected to an end of the corresponding function assembly away from the ear hook and the ear hook is provided in a streamlined shape with the function assembly.

19. The earphone of claim 18, wherein the rear hook includes a metal body, the metal body being electrically connected to the function assembly to act as an antenna for the earphone.

* * * * *